US008385645B2

(12) United States Patent
Ogawa

(10) Patent No.: US 8,385,645 B2
(45) Date of Patent: Feb. 26, 2013

(54) OBJECT DETECTING DEVICE, IMAGING APPARATUS, OBJECT DETECTING METHOD, AND PROGRAM

(75) Inventor: Kaname Ogawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 879 days.

(21) Appl. No.: 12/506,698

(22) Filed: Jul. 21, 2009

(65) Prior Publication Data

US 2010/0067742 A1 Mar. 18, 2010

(30) Foreign Application Priority Data

Sep. 12, 2008 (JP) ................................. 2008-234085

(51) Int. Cl.
*G06K 9/00* (2006.01)
(52) U.S. Cl. ........................................ 382/171; 382/173
(58) Field of Classification Search ........... 382/168–176
See application file for complete search history.

(56) References Cited

U.S. PATENT DOCUMENTS

| 2008/0025568 | A1* | 1/2008 | Han et al. ...................... 382/103 |
| 2009/0034791 | A1* | 2/2009 | Doretto et al. ................ 382/103 |
| 2009/0285459 | A1* | 11/2009 | Aggarwal et al. ............. 382/125 |
| 2010/0054535 | A1* | 3/2010 | Brown et al. .................. 382/103 |

FOREIGN PATENT DOCUMENTS

| JP | 2008-72183 | 3/2008 |
| JP | 2009-301104 | 12/2009 |

OTHER PUBLICATIONS

Hirotsune Fujiyoshi, et al., "Vehicle detection by two step AdaBoost using Joint HOG feature", Dynamic image processing utilization workshop 2008 lecture memoirs, Japan Society for Precision Engineering, Mar. 6, 2008, pp. 101-106.
Navneet Dalal, "Finding People in Images and Videos", Internet Citation, URL: http://lear.inrialpes.fr/people/dalal/Navneet Dalal Thesis.pdf, XP007907252, Jul. 17, 2006, 131 pages.
Feng Han, et al., "A Two-Stage Approach to People and Vehicle Detection with HOG-Based SVM", Internet Citation, XP009127403, 2006, pp. 133-140.

* cited by examiner

*Primary Examiner* — Jingge Wu
(74) *Attorney, Agent, or Firm* — Oblon, Spivak, McClelland, Maier & Neustadt, L.L.P.

(57) ABSTRACT

An object detecting device includes a calculating unit configured to calculate gradient intensity and gradient orientation of luminance for a plurality of regions in an image and calculate a frequency distribution of the luminance gradient intensity as to the calculated luminance gradient orientation for each of the regions, and a determining unit configured to determine whether or not an identified object is included in the image by comparing a plurality of frequency distributions calculated for each of the regions.

14 Claims, 19 Drawing Sheets

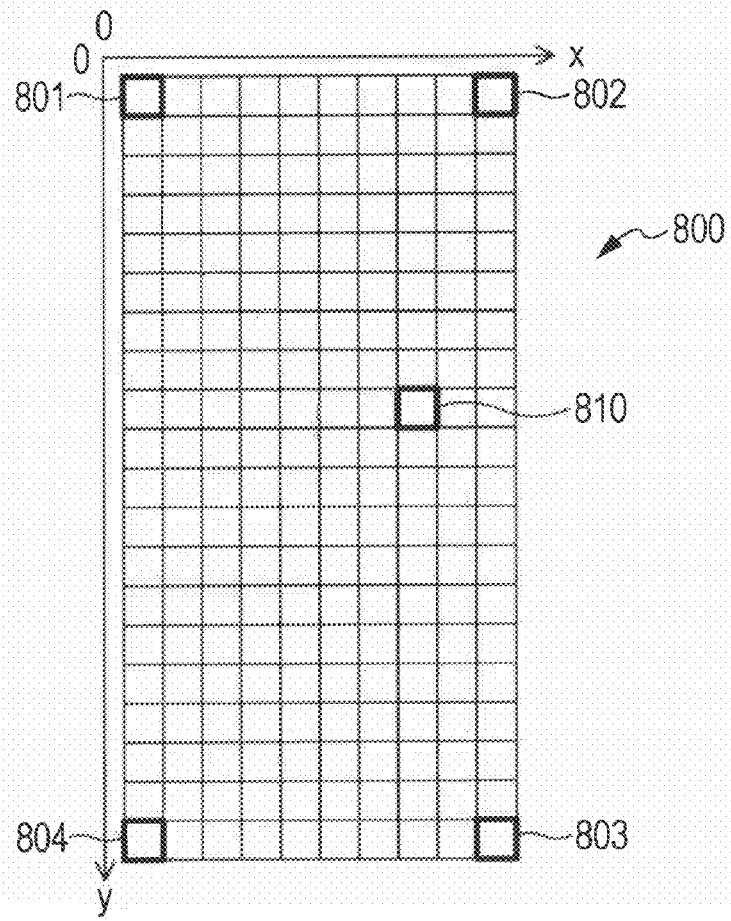

840

841

842

842

852

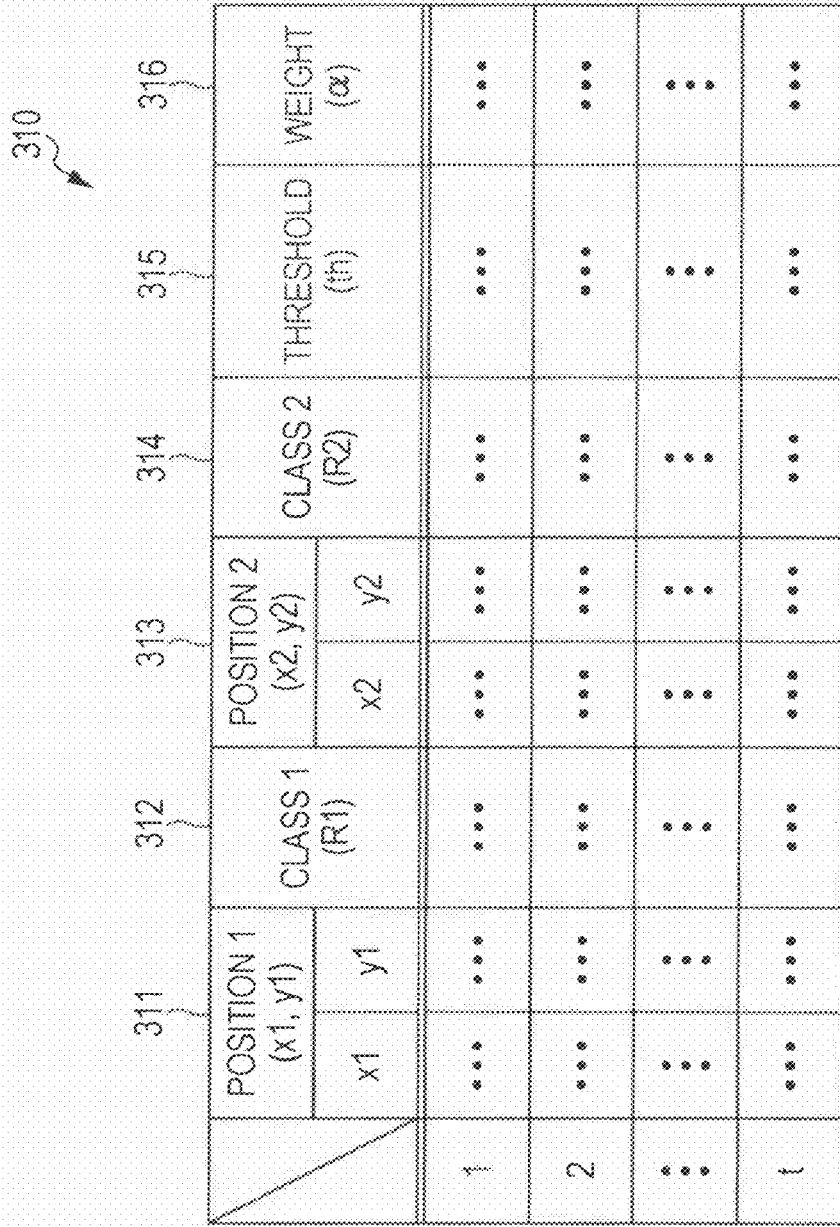

FIG. 12
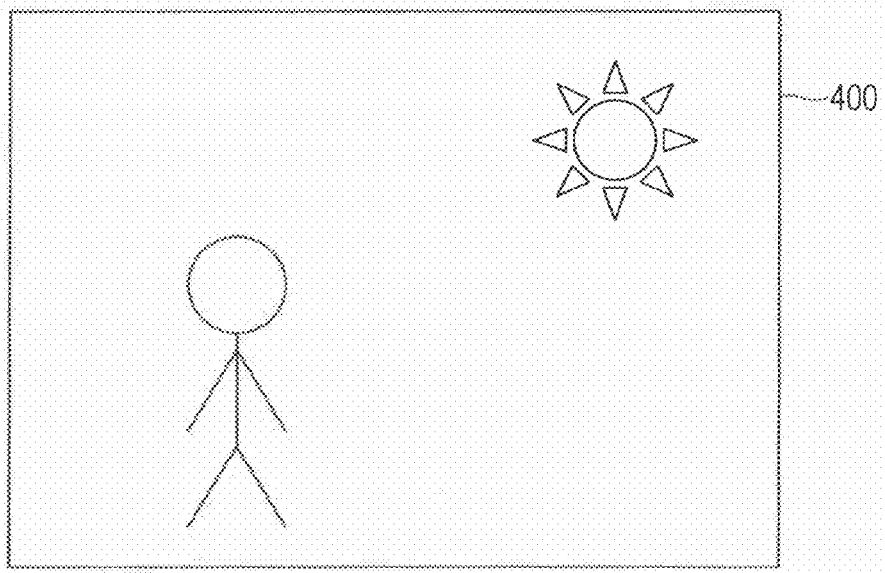
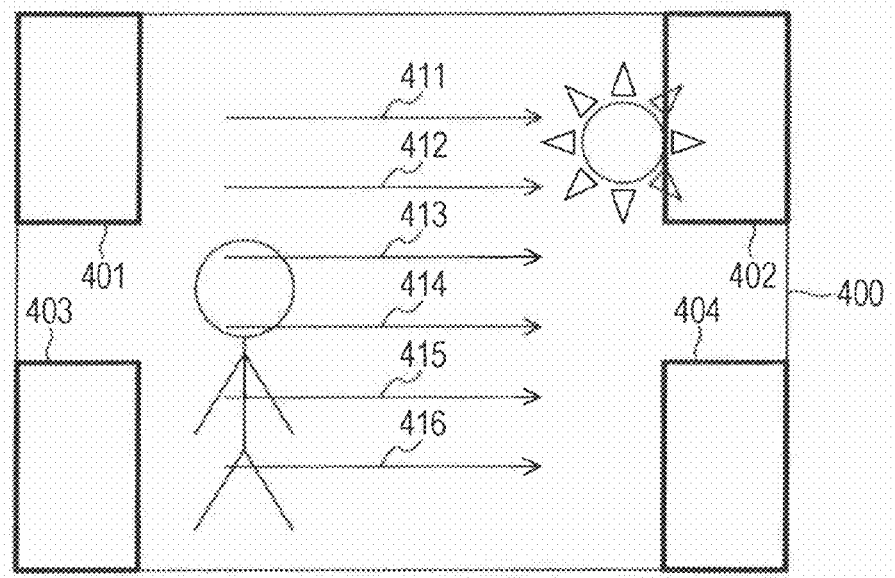

FIG. 16
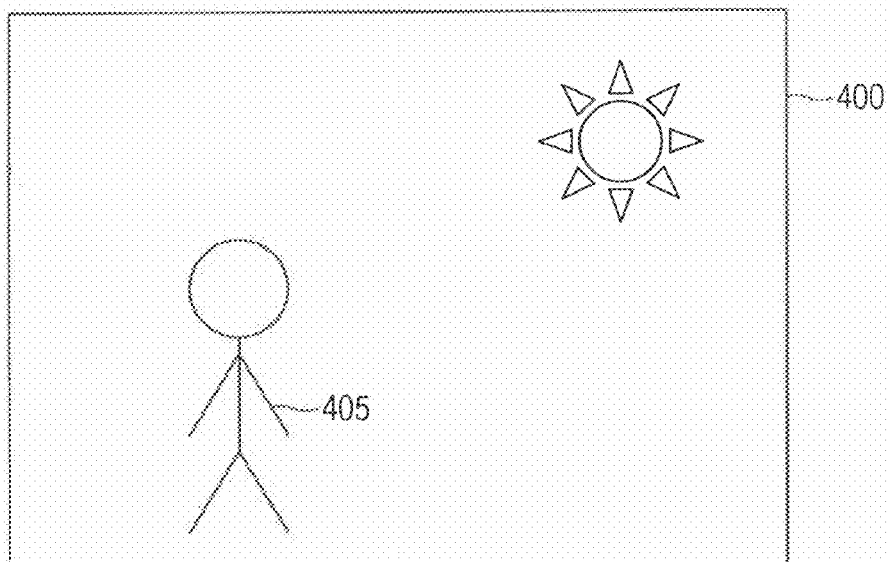
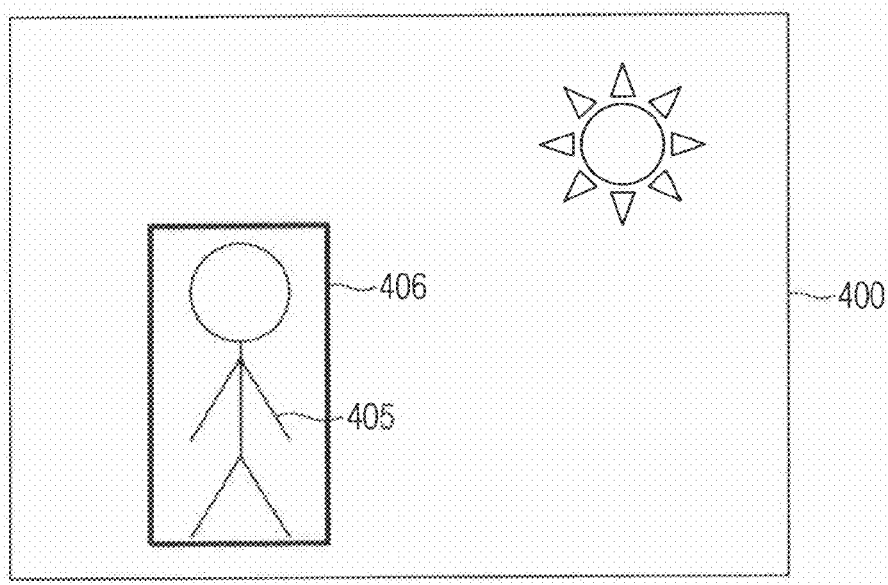

OBJECT DETECTING DEVICE, IMAGING APPARATUS, OBJECT DETECTING METHOD, AND PROGRAM

BACKGROUND OF THE INVENTION

1. Field of the Invention

The present invention relates to an object detecting device, and more specifically relates to an object detecting device that detects identified objects such as a person from an imaged image, an imaging device, a processing method thereof, and a program for a computer to execute the method thereof.

2. Description of the Related Art

Hitherto, a subject recognizing technique has been proposed, in which there is recognized what a subject is that is included in an imaged image generated by an imaging device such as a digital still camera or digital video camera (e.g. an integrated camera/recorder or the like). As a subject recognizing technique, for example a face-detecting technique has been proposed that detects the face of a person from the imaged image with the image processing using feature amounts such as luminance and color. It is conceivable that a person can be detected using this detecting technique. However, in the case that the object of detection is a person, the color of clothing and so forth often differ depending on the person, whereby it is assumed to be difficult to detect a person with the image processing using feature amounts such as luminance and color.

Accordingly, an object detecting technique has been proposed, for example, that detects objects such as a person or a vehicle using outlines of objects to be detected. For example, a technique has been proposed that performs object detection using a gradient oriented histogram (HOG: Histograms of Oriented Gradients) which is a type of histogram of luminance in multiple regions within an image (frequency distribution) (e.g. see "Histograms of Oriented Gradients for Human Detection", Navneet Dalal, 2005".) A gradient oriented histogram is created by dividing a target image into multiple regions for example, computing the gradient intensity and gradient orientation of the luminance for each region, and based on the gradient intensity and gradient orientation of the luminance thereof.

SUMMARY OF THE INVENTION

With the above-described techniques, in order to prevent the reduction of detection precision by the lightness/darkness of an object, the created gradient oriented histogram is normalized and object detection is performed using a gradient oriented histogram after normalizing, for example.

However, in the case of performing object detecting with an imaged image generated with a digital still camera or an imaging device such as digital still camera, improving precision of the object detecting as well as reducing the burden of the processing relating to the object detecting becomes important. Thus, in each situation, improving precision of object detecting, as well as reducing the burden of processing relating to the object detecting, becomes important.

There has been found demand for enabling appropriate detection of identified objects included in an image.

According to an embodiment of the present invention, there are provided an object detecting device, a processing method thereof, and a program to cause a computer to execute the method, the object detecting device including: a calculating unit to calculate gradient intensity and gradient orientation of luminance for a plurality of regions in an image and to calculate a frequency distribution of the luminance gradient intensity as to the calculated luminance gradient orientation for each of the regions; and a determining unit to determine whether or not an identified object is included in the image by comparing a plurality of frequency distributions calculated for each of the regions. Thus, the operation of determining whether or not an identified object is included in an image is brought about by computing a frequency distribution relating to gradient intensity and gradient orientation of luminance for the multiple regions of an image, and comparing the multiple frequency distributions.

The calculating unit may calculate each of the frequency distributions for a first region and a second region set beforehand in the image; and the determining unit may determine whether or not the identified object is included in the image by comparing a value of one class set beforehand of classes of the frequency distribution calculated for the first region and a value of one class set beforehand of classes of the frequency distribution calculated for the second region. Thus, the operation of determining whether or not an identified object is included in an image is brought about by comparing a value of one class set beforehand of classes of the frequency distribution calculated for the first region and a value of one class set beforehand of classes of the frequency distribution calculated for the second region.

The calculating unit may calculate multiple combinations of the frequency distribution relating to the first region and the frequency distribution relating to the second region; and the determining unit may determine whether or not the identified object is included in the image by comparing each of the combinations of a value of one class set beforehand of classes of the frequency distribution calculated for the first region and a value of one class set beforehand of classes of the frequency distribution calculated for the second region. Thus, the operation of determining whether or not an identified object is included in an image is brought about by comparing a value of one class set beforehand of classes of the frequency distribution calculated for the first region and a value of one class set beforehand of classes of the frequency distribution calculated for the second region for each of the multiple combinations.

The determining unit may determine whether or not the identified object is included in the image by calculating a difference value between a value of one class set beforehand of classes of the frequency distribution calculated for the first region and a value of one class set beforehand of classes of the frequency distribution calculated for the second region, and based on the difference value. Thus, the operation of determining whether or not an identified object is included in an image is brought about by calculating a difference value between a value of one class set beforehand of classes of the frequency distribution calculated for the first region and a value of one class set beforehand of classes of the frequency distribution calculated for the second region, and the determination is based on the difference value herein.

The first region and the second region are regions that may not mutually overlap in the image. Thus, the operation of determining whether or not an identified object is included in an image is brought about by using two frequency distributions calculated for two regions that do not mutually overlap.

The object detecting device may further include: a determining information storage unit to store a plurality of determining information including combinations of a first position that is a position of a region in the image; a first class that is one class of the classes of the frequency distribution; a second class that is a position of a region in the image and that differs from the first position; a second class that is one class of the classes of the frequency distribution; a threshold value; and a weighting value; wherein the calculating unit may calculate the first frequency distribution which is the frequency distribution relating to the region identified by the first position and the second frequency distribution which is the frequency distribution relating to the region identified by the second position, for each set of the determining information; and wherein the determining unit may determine whether or not an identified object is included in the image based on an evaluation value, the evaluation value calculated by calculating a difference value between the value of the first class of the classes of the first frequency distribution and the value of the second class of the classes of the second frequency distribution; comparing the difference value and the threshold value; and calculating an evaluation value by performing computing of the weighting value based on the compared result. Thus, the operation of determining whether or not an identified object is included in an image is brought about by calculating a difference value between the value of the first class of the classes of the first frequency distribution and the value of the second class of the classes of the second frequency distribution, comparing the difference value and the threshold value, and calculating an evaluation value by performing computing of the weighting value based on the compared result for each set of the determining information.

The identified object may be a person. Thus, the operation of determining whether or not a person is included in the image is brought about by calculating frequency distributions relating to gradient intensity and gradient orientation of the luminance for multiple regions in an image and by comparing the multiple frequency distributions herein.

Also, according to an embodiment of the present invention, there are provided an imaging apparatus, a processing method thereof, and a program to cause a computer to execute the method, the imaging apparatus including: an imaging unit to image a subject and generate an imaged image; an image extracting unit to extract a determination target image serving as a determination target from the imaged image; a calculating unit to calculate gradient intensity and gradient orientation of luminance for multiple regions in the determination target image and to calculate a frequency distribution of luminance gradient intensity as to the calculated luminance gradient orientation for each of the regions; and a determining unit to determine whether or not an identified object is included in the determination target image by comparing the multiple frequency distributions calculated for each of the regions. Thus, the operation of determining whether or not an identified object is included in a determination target image is brought about by calculating frequency distribution relating to gradient intensity and gradient orientation of luminance for multiple regions in the determination target image extracted from the imaged image and comparing the multiple frequency distributions herein.

According to the above configurations, an excellent advantage can be obtained in that an identified object included in an image can be detected suitably.

BRIEF DESCRIPTION OF THE DRAWINGS

FIGS. 4A and 4B are diagrams schematically illustrating an image that is to be a target of person determining processing by a person determining unit according to an embodiment of the present invention;

FIG. 11 is a diagram schematically illustrating a person detecting dictionary stored in a person detecting dictionary storage unit according to an embodiment of the present invention;

FIG. 12 is a diagram schematically illustrating an image extracting method to extract an image that is to be a target of person determining processing by the person determining unit according to an embodiment of the present invention;

FIG. 16 is a diagram illustrating an image that is to be the target of the person detecting processing by the person detecting unit, and the detection results of the person detecting processing by the person detecting unit, according to an embodiment of the present invention;

DESCRIPTION OF THE PREFERRED EMBODIMENTS

Figure 1:
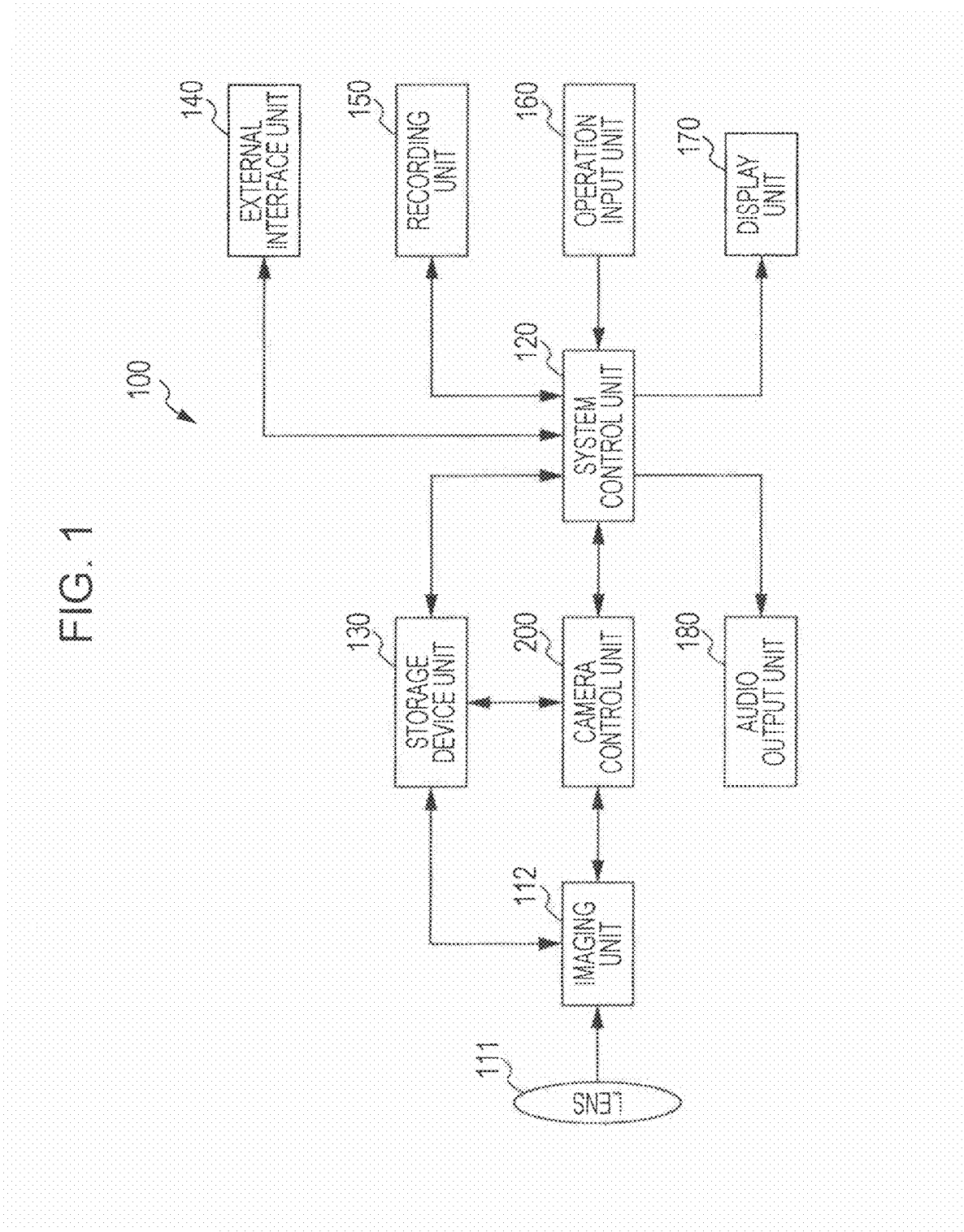
FIG. 1 is a block diagram illustrating an example of a functional configuration of an imaging apparatus according to an embodiment of the present invention.

An embodiment of the present invention will be described in detail with reference to the diagrams. FIG. 1 is a block diagram showing a functional configuration example of an imaging apparatus 100 according to an embodiment of the present invention. The imaging apparatus 100 has a lens 111, imaging unit 112, system control unit 120, storage device unit 130, external interface unit 140, recording unit 150, operation input unit 160, display unit 170, audio output unit 180, and camera control unit 200. The imaging apparatus 100 can be realized by a digital still camera for example, which can image a subject to generate image data, extract various feature amounts from the image data by image analysis, and perform various types of image processing using the various extracted feature amounts.

The lens 111 is made up of multiple lenses (zoom lens, focus lens, etc) that converge light from the subject, and the light irradiated from the subject is supplied to the imaging unit 112 via the lenses herein.

The imaging unit 112 has an imaging element (unshown) having an electronic shutter function and a signal processing unit (unshown) that processes output signals from the imaging element herein to generate an imaged image (image data). That is to say, an imaged image is generated at the imaging unit 112 by an optical image of the subject irradiated via the lens 111 is formed onto the imaging facing of the imaging element, the imaging element performs imaging operation in this state, and the signal processing unit performs signal processing as to the imaging signal. The generated imaged image is then supplied to the storage device unit 130 and stored. Note that the camera parameters (imaging parameters) used to generate the imaged image is sequentially determined by the camera control unit 200.

The camera control unit 200 controls the imaging unit 112 based on the imaged image supplied from the imaging unit 112 via the storage device unit 130 and control by the system control unit 120. Note that the camera control unit 200 will be described in detail with reference to FIG. 2.

The system control unit 120 performs control for the entire imaging apparatus 100. For example, the system control unit 120 performs control according to operating input from a user accepted by the operation input unit 160. Also, the system control unit 120 controls the display of menu screens and so forth displayed on the display unit 170, recording and reading of imaged images as to the recording unit 150, communication with external computers and networks performed via the external interface unit 140, and so forth. Further, at time of monitoring during the imaging operations, the system control unit 120 performs control to display the imaged image generated by the imaging unit 112 on the display unit 170.

The storage device unit 130 is a primary storage device to temporarily save the imaged images and so forth on the system of the imaging apparatus 100, and for example is made up with DRAM (Dynamic Random Access Memory). That is to say, the exchange of imaged images between the various units within the imaging apparatus 100 is performed primarily via the storage device unit 130.

The external interface unit 140 is an external interface having input/output terminals such as USB (Universal Serial Bus), and provides an interface for connections with external computers and network connections.

The storage unit 150 records the imaged images generated by the imaging unit 112, based on control by the system control unit 120. Also, the recording unit 150 reads the recorded imaged image and supplies this to the system control unit 120, based on control by the system control unit 120. A recording medium such as a flash memory or the like may be used as the recording unit 150, for example. Also, the recording unit 150 can be built in to the imaging apparatus 100, or may be mounted on the imaging apparatus 100 so as to be detachable.

The operation input unit 160 is an operation input unit receiving operation input from the user, and signals according to the received operation input is output to the system control unit 120. For example, upon a shutter button being pressed for instructing recording of the imaged image, a signal corresponding to the shutter button pressing is output to the system control unit 120.

The display unit 170 is a display unit to display the various types of images, based on control by the system control unit 120. For example, the display unit 170 displays the imaged images generated by the imaging unit 112, the imaged images read from the recording unit 150, the menu screens provided to the user, and so forth.

The audio output unit 180 outputs various types of audio information based on control of the system control unit 120. The audio output unit 180 can be realized with a speaker, for example.

Figure 2:
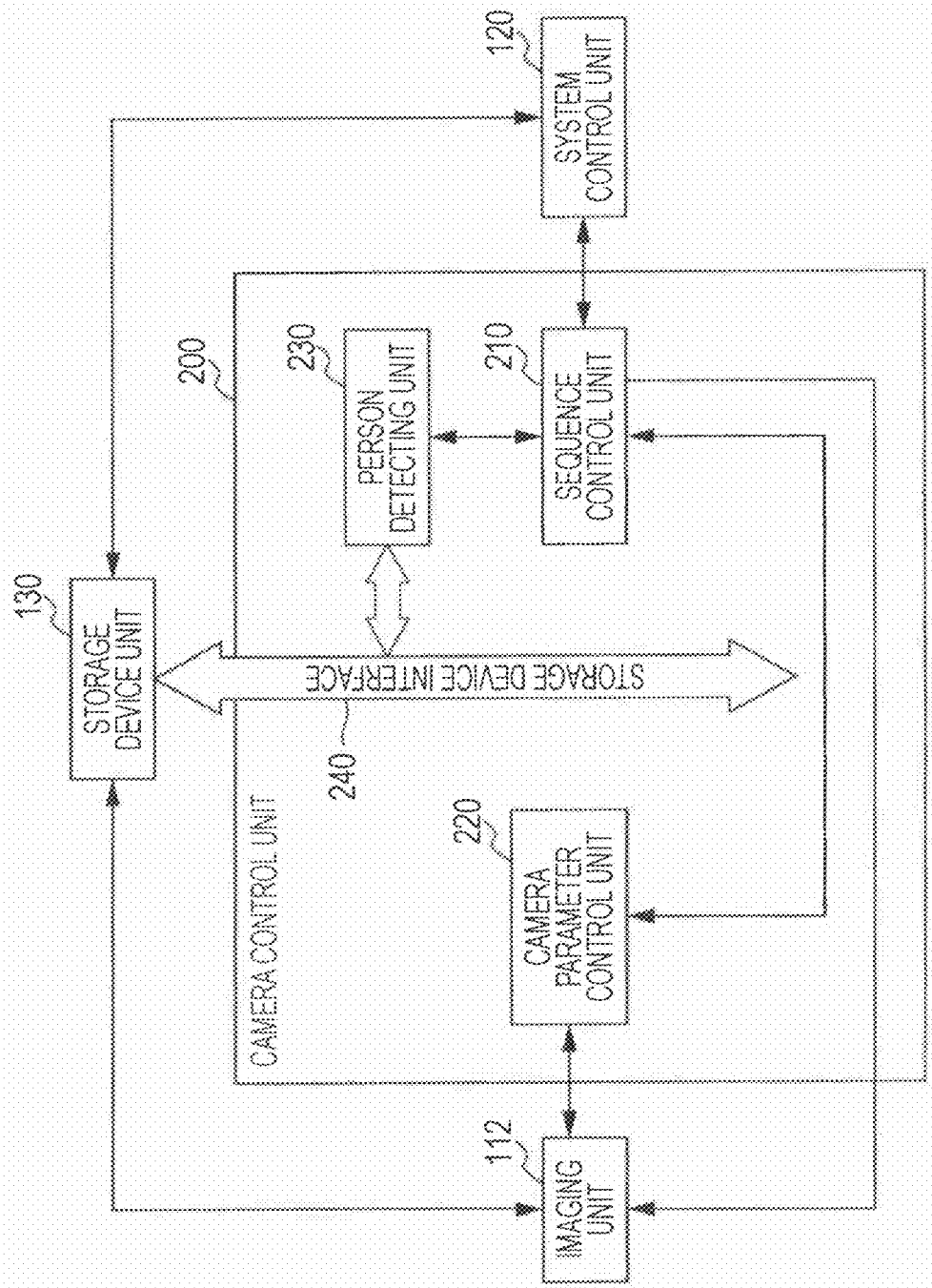
FIG. 2 is a block diagram illustrating an example of a functional configuration of a camera control unit according to an embodiment of the present invention.

FIG. 2 is a block diagram showing a functional configuration example of the camera control unit 200 according to an embodiment of the present invention. A configuration of the imaging unit 112, system control unit 120, and storage device unit 130 shown in FIG. 1 are also shown in FIG. 2, along with the functional configuration example of the camera control unit 200. The camera control unit 200 has a sequence control unit 210, camera parameter control unit 220, person detecting unit 230, and storage device interface 240. Now, the exchange of imaged images performed between the storage device unit 130 and the camera parameter control unit 220, or between the storage device unit 130 and the person detecting unit 230, is performed via the storage device interface 240.

The sequence control unit 210 is started with an imaged image recording standby command from the system control unit 120, and holds a state wherein the imaged images generated by the imaging unit 112 can be recorded. In the imaged image recording standby state, the imaged images generated by the imaging unit 112 are sequentially stored in the storage device unit 130. For example, the imaged images stored in the storage device unit 130 are sequentially updated at intervals of 1/60th seconds. Also, the sequence control unit 210 performs control so that the camera parameter control unit 220 determines the camera parameters, based on the current imaged image stored in the storage device unit 130 (the newest imaged image generated with the imaging unit 112). Also, the sequence control unit 210 performs control for the person detecting unit 230 to perform person detecting processing for the current imaged image stored in the storage device unit 130. Now, in the case that the person detecting information indicating that a person has been detected is output from the person detecting unit 230, the sequence control unit 210 outputs information to the effect that a person has been detected to the system control unit 120 and the camera parameter control unit 220.

The camera parameter control unit 220 determines the camera parameters relating to the imaged images, and performs imaging control as to the imaging unit 112, using the determined camera parameters. Specifically, the camera parameter control unit 220 acquires the current imaged image stored in the storage device unit 130 via the storage device interface 240, based on triggers from the sequence control unit 210. The camera parameter control unit 220 then evaluates the current imaged image and determines the camera parameters such as shutter speed, exposure, white balance, and so forth. Also, in the case that a person is detected in the current imaged image, the camera parameter control unit 220 determines the camera parameters such as shutter speed, exposure, white balance, and so forth, based on the evaluation of the detected person and the current imaged image. For example, in the case that a person has been detected, optimal camera parameters are determined for the detected person, based on the position and size of the detected person in the imaged image.

The person detecting unit 230 performs person detecting processing for the current imaged image stored in the storage device unit 130, and in the case that a person is detected, the person detection information is output to the sequence control unit 210. Specifically, the person detecting unit 230 obtains the current imaged image stored in the storage device unit 130 via the storage device interface 240, and performs person detection processing for the current imaged image, based on the trigger from the sequence control unit 210. Now, the person detection information is information relating to the detected person, and for example is information including a score that expresses the position, size, and degree of the person in the imaged image of the detected person. Note that the person detecting unit 230 will be described in detail with reference to FIG. 3.

Figure 3:
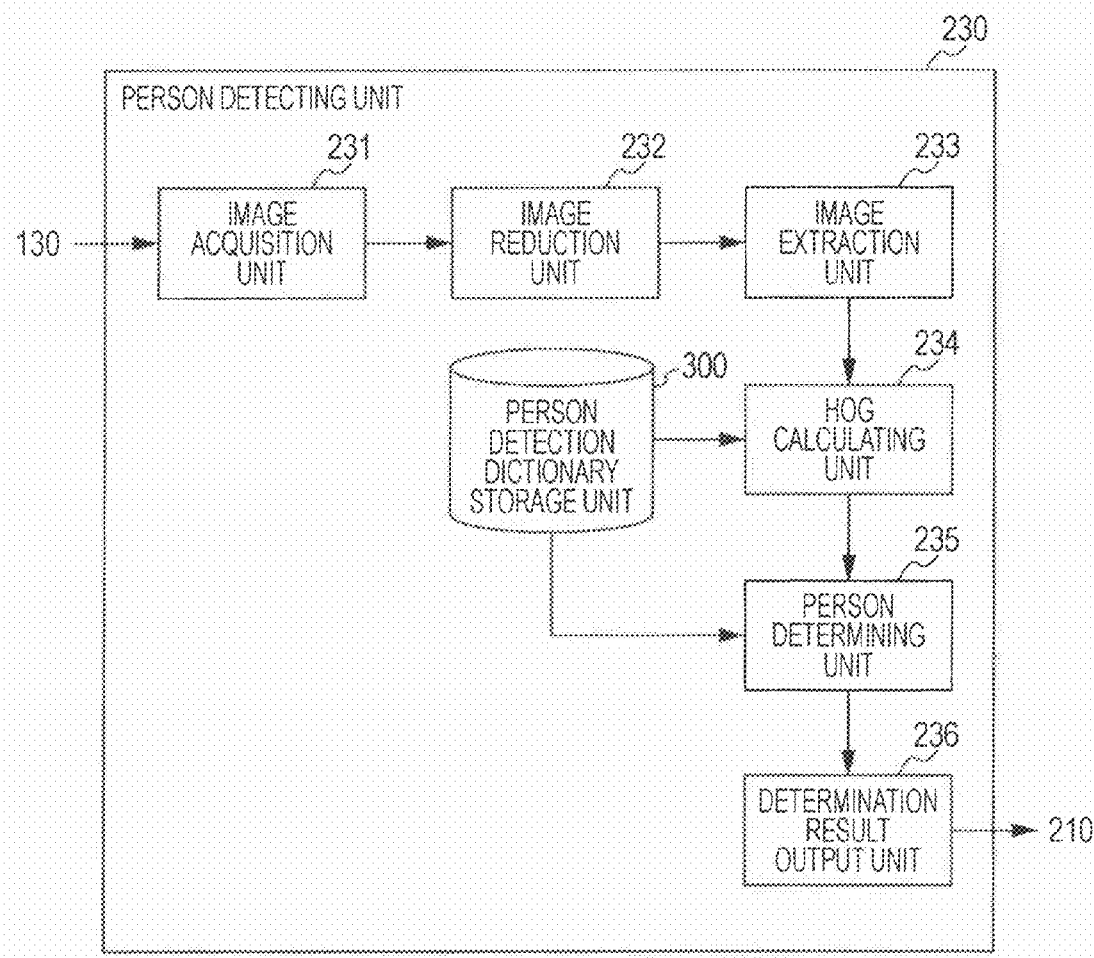
FIG. 3 is a block diagram illustrating an example of a functional configuration of a person detecting unit according to an embodiment of the present invention.

FIG. 3 is a block diagram showing a functional configuration example of the person detecting unit 230 according to an embodiment of the present invention. The person detecting unit 230 has an image acquisition unit 231, image reduction unit 232, image extraction unit 233, HOG calculating unit 234, person determining unit 235, determination result output unit 236, and person detection dictionary storage unit 300.

The image acquisition unit 231 acquires the imaged image stored in the storage device unit 130, via the storage device interface 240, and outputs the acquired imaged image to the image reduction unit 232.

The image reduction unit 232 generates multiple images of differing sizes by sequentially reducing the imaged image output from the image acquisition unit 231 at a predetermined ratio, and sequentially outputs each generated image to the image acquisition unit 233. Note that the reduction of the imaged images herein will be described in detail with reference to FIG. 13.

The image extraction unit 233 sequentially extracts the images included in a predetermined region for each image output from the image reduction unit 232, and outputs the extracted images (determination target image) to the HOG calculating unit 234. Note that the extraction of the images herein will be described in detail with reference to FIGS. 12 and 13.

The person detection dictionary storage unit 300 stores a person detection dictionary to perform person detection processing of an image output from the image extraction unit 233. The person detection processing performs, for example, calculating processing of gradient oriented histograms (HOG: Histograms of Oriented Gradients) by the HOG calculating unit 234, and person determining processing by the person determining unit 235. The stored person detection dictionary is then supplied to the HOG calculating unit 234 and the person determining unit 235. Note that the person detection dictionary will be described in detail with reference to FIG. 11. The person detection dictionary storage unit 300 is an example of the determining information storage unit referred to in the Summary of the Invention.

The HOG calculating unit 234 calculates the HOG for multiple regions using a luminance value in the determination target image output from the image extraction unit 233, and outputs the calculated HOG to the person determining unit 235. Note that each region of the determination target image to serve as the calculation target of the HOG by the HOG calculating unit 234 is identified based on the position information of the person detection dictionary stored in the person detection dictionary storage unit 300. Note that the HOG will be described in detail with reference to FIGS. 4A through 10B. Also, the calculations of the HOG of the determination target image will be described in detail with reference to FIGS. 14 and 15. The HOG calculating unit 234 is an example of the calculating unit referred to in the Summary of the Invention.

The person determining unit 235 performs person determining processing to determine whether or not a person is included in the determination target image output from the image extraction unit 233. The determination results are then output to the determination result output unit 236. As a result of the determination herein, for example the position and size of the detected person in the imaged image and a score expressing the degree of the person therein is output. Specifically, the person determining unit 235 performs person determining processing by comparing multiple HOGs output from the HOG calculating unit 235, using the person detection dictionary stored in the person detection dictionary storage unit 300. The person determining processing by the person determining unit 235 will be described in detail with reference to FIGS. 14 through 16. The person determining unit 235 is an example of the determining unit referred to in the Summary of the Invention.

In the case that determination results, determining that a person is included in the determination target image output from the image extraction unit 233, are output from the person determining unit 235, the determination result output unit 236 outputs the person detecting information showing information to the effect that a person has been detected from the imaged image, to the sequence control unit 210. The person detecting information includes, for example, position and size of the detected person in the imaged image, and a score expressing the degree of the person therein.

Next, the gradient oriented histogram (HOG) used in the person detecting processing according to the embodiment of the present invention will be described in detail with reference to diagrams. Now, HOG is a type of histogram (frequency distribution), and for example, may be a histogram that divides the determination target image into multiple regions, calculates the gradient intensity and gradient angle (gradient orientation) of the luminance in each region, and is calculated for each region based on the values herein. According to an embodiment of the present invention, an example will be described wherein person detection processing is performed using the HOG calculated for identified regions of the determination target image as feature amounts of the determination target image.

FIGS. 4A and 4B are diagrams schematically showing an image to serve as a target of the person determining processing by the person determining unit 235 according to an embodiment of the present invention. FIG. 4A shows a determination target image 800 to serve as the target of the person determining processing by the person determining unit 235, and FIG. 4B shows a region 810 which is a region of a portion of the determination target image 800. Note that in FIG. 4A, each region in the determination target image 800, which is divided into 200 regions, is shown as a rectangle, and in FIG. 4B each pixel included in the region 810 is shown as a rectangle. Also, the determination target image 800 is an image made up of 50 pixels×100 pixels for example, and each region in the determination target image 800 is a region made up of 5 pixels×5 pixels, for example, as shown in FIG. 4B.

Figures 5A, 5B, 5C:
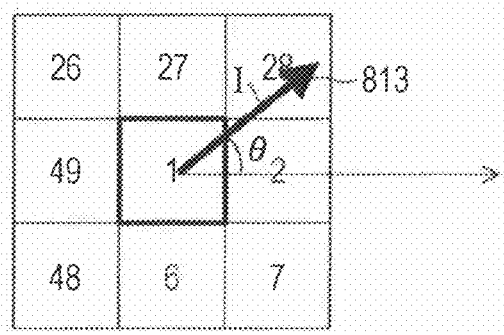
FIGS. 5A through 5C are diagrams schematically illustrating pixels that are used in the event of HOG calculating by an HOG calculating unit according to an embodiment of the present invention.

FIGS. 5A through 5C are diagrams schematically showing the pixels used in the event of HOG calculation by the HOG calculating unit 234 according to an embodiment of the present invention. FIG. 5A shows pixels 1 through 25 which are included in the region 810 shown in FIG. 4B and the pixels 26 through 49 in the periphery of region 810. FIG. 5B shows 9 pixels included in the region 811 of the various pixels shown in FIG. 5A. FIG. 5C schematically shows the gradient angle and gradient intensity of the luminance calculated for the pixel 1 shown in FIG. 5B, with vectors. Now, to calculate the HOG for the region 810, a case wherein the gradient angle and gradient intensity of the luminance calculated for the pixel 1 in the upper left corner of the region 810 will be described exemplarily. The gradient angle of the luminance is a value expressing the gradient angle of luminance of a target pixel for example, and the gradient intensity of luminance is a value indicating the gradient intensity of luminance of a target pixel, for example. The values herein will be described in detail below.

In the case of computing the gradient angle and gradient intensity of the luminance for the pixel 1, four pixels (pixels 2, 6, 27, 49 within the broken line 812) that are adjacent in the horizontal direction (x direction) and vertical direction (y direction) of the pixel 1, for example, as shown in FIG. 5B. First, the luminance component (Y component) of the four pixels (pixels 2, 6, 27, 49) that are adjacent to the pixel 1 are extracted. For example, in the case that the coordinates of the pixel 1 are Z(x, y), the luminance component of the pixel 2 is P(x+1, y), the luminance component of the pixel 6 is P(x, y+1), the luminance component of the pixel 27 is P(x, y−1), and the luminance component of the pixel 49 is P(x−1, y). In this case, for example, the gradient angle θ(x, y) of the luminance in the pixel 1 is calculated using Expression 1. Also, the gradient intensity I(x, y) of the luminance in pixel 1 is calculated using Expression 2.

$$\theta(x, y) = \tan^{-1}\left(\frac{P(x, y+1) - P(x, y-1)}{P(x+1, y) - P(x-1, y)}\right) \quad \text{Expression 1}$$

$$I(x, y) = \sqrt{(P(x+1, y) - P(x-1, y))^2 + (P(x, y+1) - P(x, y-1))^2} \quad \text{Expression 2}$$

The gradient angle θ(x, y) of the luminance and the gradient intensity I(x, y) of the luminance relating to the pixel 1 are thus calculated using the difference values of the luminance components of the four pixels (pixels 2, 6, 27, 49) that are adjacent to the pixel 1. The gradient of luminance does not have to take orientation into account, of the gradient angle θ(x, y) of the luminance has a range of 0 through 180 degrees. Using the gradient angle θ(x, y) of the luminance and the gradient intensity I(x, y) of the luminance thus calculated, a vector 813 showing the gradient of the luminance relating to the pixel 1 can be created, as shown in FIG. 5C for example. For example, a vector 813 can be created wherein the gradient angle θ(x, y) of the luminance is an angle as to the horizontal direction (x-axis) and the gradient intensity I(x, y) of the luminance is the size. FIG. 5C shows the vector 813 with the vicinity of the center of the rectangle indicating the pixel 1 as a starting point. Also, similarly for the pixels 2 through 25 included in the region 810, the gradient angle θ(x, y) of the luminance and the gradient intensity I(x, y) of the luminance can be calculated.

Note that the gradient angle θ(x, y) of the luminance and the gradient intensity I(x, y) of the luminance is not calculated for each pixel existing on the edge portion of the determination target image, and accordingly these calculations are not performed. For example, of the regions 801 through 804 shown in FIG. 4A, two sides of the rectangle apply to the edge portions of the determination target image 800. Therefore, for each pixel in contact with the two sides thereof, calculations of the gradient angle of the luminance and the gradient intensity of the luminance are not performed. Also, with each region existing between regions 801 and 802, each region existing between regions 802 and 803, each region existing between regions 803 and 804, and each region existing between regions 804 and 801, one side of the rectangle applies to an edge portion of the determination target image 800 itself. Therefore, for each pixel in contact with the one side thereof, calculations of the gradient angle of the luminance and the gradient intensity of the luminance are not performed.

Note that an example is described wherein the gradient angle and the gradient intensity of the luminance are calculated using four pixels adjacent in the horizontal direction and vertical direction to the pixel (target pixel) which is a calculation target of gradient angle and gradient intensity of the luminance. However, for example, the gradient angle and gradient intensity of the luminance can be calculated using four pixels that are one pixel apart in the horizontal direction and vertical direction of the target pixel. Also, for example, the gradient angle and gradient intensity of the luminance can be calculated using another four pixels that exist in the vicinity in the horizontal direction and vertical direction of the target pixel.

Figure 6A:
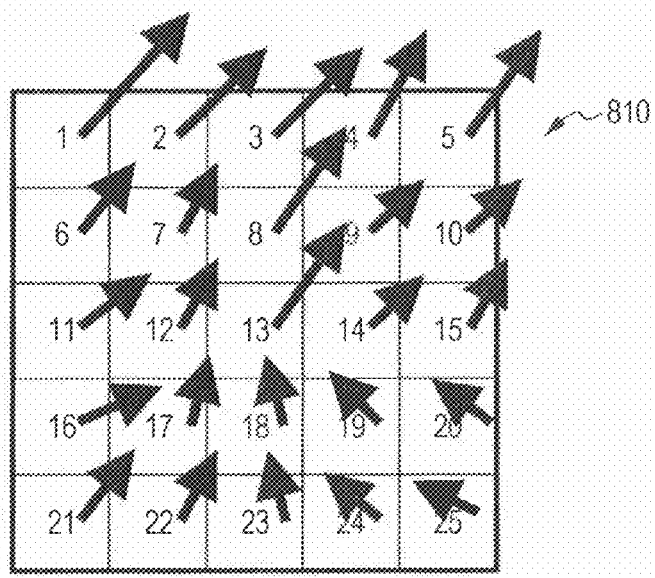
FIGS. 6A through 6C are diagrams schematically illustrating vectors, a histogram, and an edge intensity distribution that are expressed using a luminance gradient angle and luminance gradient intensity calculated by the HOG calculating unit according to an embodiment of the present invention.
Figure 6B:
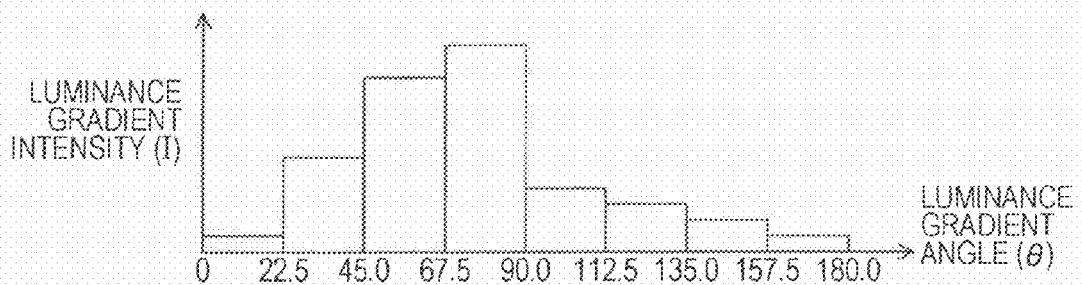
Figure 6C:
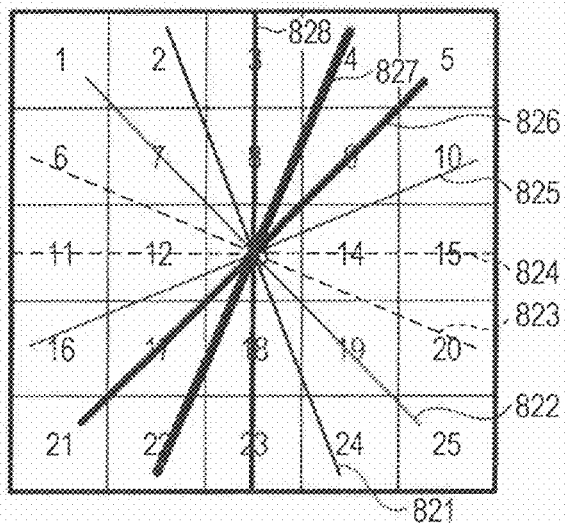

FIGS. 6A through 6C are diagrams schematically showing vectors, a histogram, and an edge intensity distribution which are expressed using the gradient angle and gradient intensity of the luminance calculated by the HOG calculating unit 234 according to an embodiment of the present invention.

FIG. 6A shows vectors corresponding to the gradient angle θ(x, y) of the luminance and the gradient intensity I(x, y) of the luminance that have been calculated for each of pixels 1 through 25 included in the region 810 shown in FIG. 4A. The example shown in FIG. 6A, similar to that in FIG. 5C, shows vectors with the vicinity of the center of the rectangle indicating each of pixels 1 through 25 as starting points, has the gradient angle θ(x, y) of the luminance as an angle corresponding to the horizontal direction (x-axis), and the gradient intensity I(x, y) of the luminance as the size thereof. With the vectors herein, the gradient angle and gradient intensity of the luminance of the region 810 can be readily understood visually.

FIG. 6B shows a histogram created based on the gradient angle θ(x, y) of the luminance and the gradient intensity I(x, y) of the luminance that have been calculated for each of pixels 1 through 25 included in the region 810 shown in FIG. 4A. The histogram shown in FIG. 6B is an HOG, whereof the horizontal axis is an axis indicating the gradient angle of luminance, and the vertical axis is an axis indicating the frequency of gradient intensity of luminance.

In this example, angle regions for 8 segments are defined, with the range for 1 segment as 22.5 degrees, for the range of the gradient angle of luminance (segments between 0 and 180 degrees). A histogram is then created of the gradient intensity I(x, y) of the luminance as to the gradient angle θ(x, y) of the luminance that has been calculated. That is to say, a segment that the gradient angle θ(x, y) of the luminance calculated is quantized into 8 classes is the horizontal axis, and the total value of the gradient intensity I(x, y) of the luminance as to the gradient angle θ(x, y) of the luminance quantized herein is the vertical axis, whereby a histogram (frequency distribution) is calculated. The histogram shown in FIG. 6B is thereby created. This, in the case of calculating a histogram for the region 810, for example computation is performed in the raster order from the pixel 1 in the upper left corner to the pixel 25 in region 810.

FIG. 6C shows line segments 821 through 828 expressing edge intensity distribution corresponding to the histogram shown in FIG. 6B layered on the region 810 shown in FIG. 4B. Here, the angles as to the horizontal direction of the line segments 821 through 828 correspond to the class of the histogram shown in FIG. 6B, and the heaviness of the line segments 821 through 828 correspond to the frequency in the histogram shown in FIG. 6B. That is to say, the portions that have a stronger luminance gradient (outline component) have a heavier line segment heaviness. Thus, the edge intensity distribution corresponding to the histogram shown in FIG. 6B can be expressed with the line segments 821 through 828. Also, the edge intensity distribution of the region 810 which is a calculation target of the histogram can be easily understood. Also, by expressing line segments that are similar to the line segments 821 through 828 for each region of the determination target image, the edge intensity distribution for the entire determination target image can be easily understood. Thus, the outlines of objects included in the determination target image can be understood. The line segments expressing the edge intensity distribution of the entire determination target image will be described in detail with reference to the diagrams.

Figure 7A:
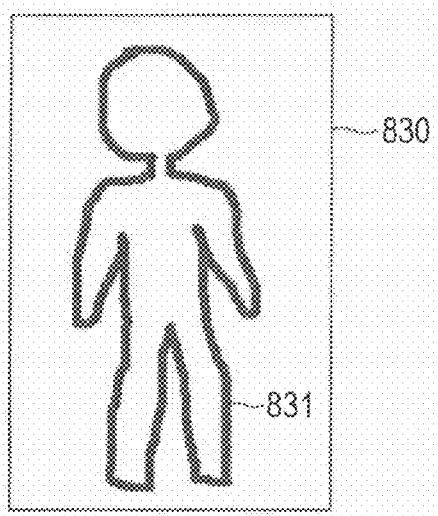
FIGS. 7A through 7C are diagrams schematically illustrating a determining target image that includes a person and a portion of multiple line segments expressing the edge intensity distribution created regarding the determining target image.
Figure 7B:
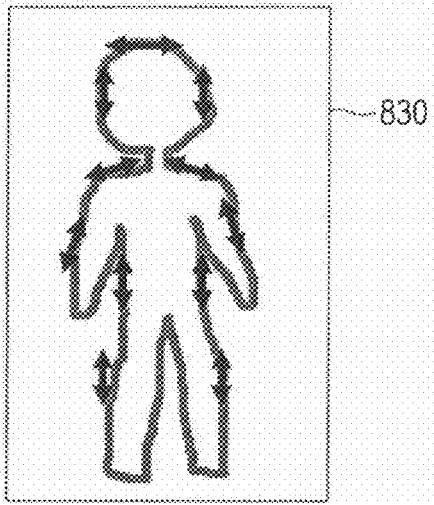
Figure 7C:
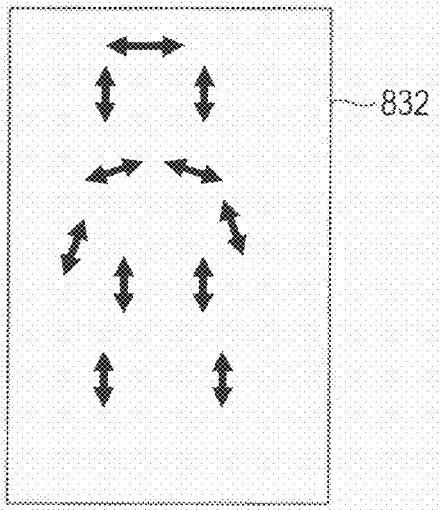

FIGS. 7A through 7C are diagrams that schematically show the determination target image 830 including a person 831 and a portion of multiple line segments expressing the edge intensity distribution created for the determination target image 830. FIG. 7A shows the determination target image 830 including the person 831, with only the outline drawn and simplified. FIG. 7B shows the case wherein a portion of the multiple line segments (arrows) that express the edge intensity distribution created for the determination target image 830 are layered onto the determination target image 830. FIG. 7C shows the line segments expressing the edge intensity distribution shown in FIG. 7B.

An HOG is calculated for each region of the determination target image 830 that includes a person 831, and line segments expressing the edge intensity distribution corresponding to the HOG herein is shown, whereby the outline of the person 831 can show up, as shown in FIGS. 7B and 7C.

Figure 8A:
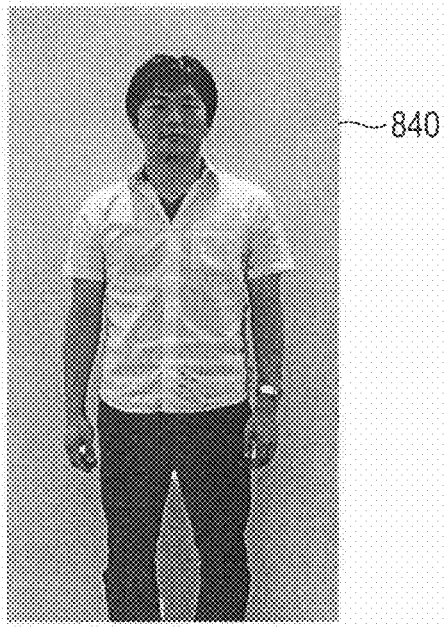
FIGS. 8A through 8C are diagrams illustrating an image that includes a person and a reduced image of the image, and line segments expressing the edge intensity distribution created regarding the reduced image.
Figure 8B:
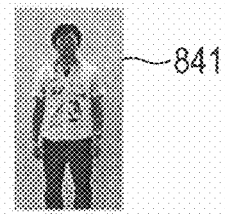
Figure 8C:
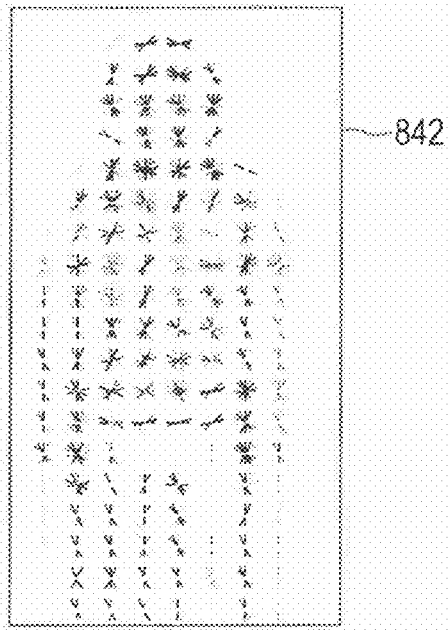

FIGS. 8A through 8C are diagrams showing the image 840 including a person and the reduced image 841 of the image 840, and the line segments shown the edge intensity distribution created for the reduction image 841. FIG. 8A shows an image 840 that includes a person, and FIG. 8B shows a reduced image 841 that has been subjected to reduction processing for the image 840 to be the target of person detecting processing (e.g. resolution conversion to 50 pixels×100 pixels). FIG. 8C shows an image 842 wherein multiple line segments expressing the edge intensity distribution created regarding the reduced image 841 are drawn. As shown in FIG. 8C, the portions having stronger luminance gradients (outline components) have blacker line segments. Thus, an HOG for each region in the reduced image 841 is calculated, and line segments expressing the edge intensity distribution corresponding to the HOG thereof are expressed, whereby the outline of the person included in the image 840 can show up.

Figure 9A:
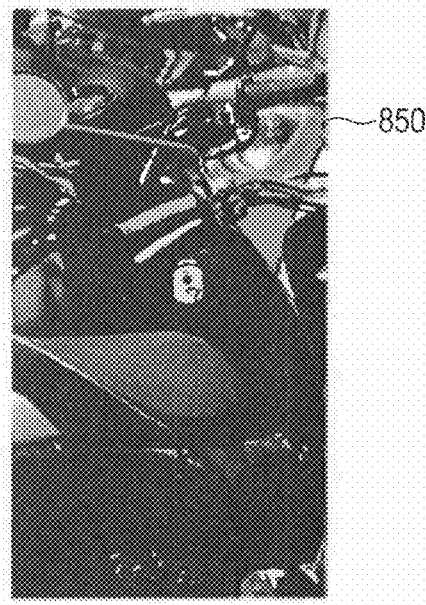
FIGS. 9A through 9C are diagrams illustrating an image that includes an object other than a person and a reduced image of the image, and line segments expressing the edge intensity distribution created regarding the reduced image.
Figure 9B:
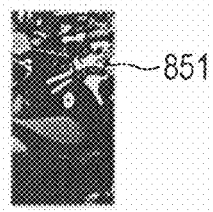
Figure 9C:
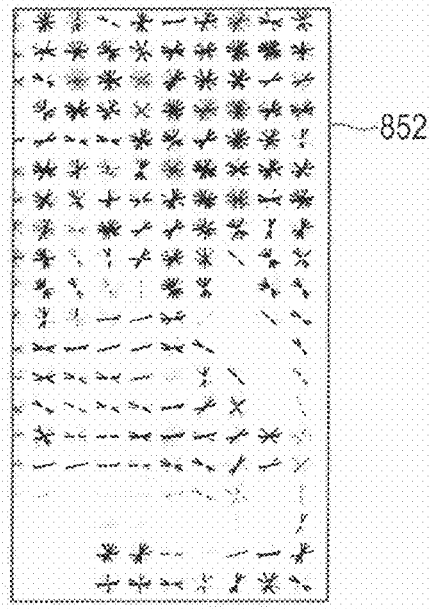

FIGS. 9A through 9C are diagrams showing the image 850 including an object other than a person and the reduced image 851 of the image 850, and the line segments shown the edge intensity distribution created for the reduction image 851. FIG. 9A shows an image 850 that includes an object other than a person (a portion of a motorcycle), and FIG. 9B shows a reduced image 851 that has been subjected to reduction processing for the image 850 to be the target of person detecting processing (e.g. resolution conversion to 50 pixels×100 pixels). Note that image 850 is shown with a portion of text and so forth omitted. FIG. 9C shows an image 852 wherein multiple line segments expressing the edge intensity distribution created regarding the reduced image 851 are drawn. As shown in FIG. 9C, the portions having stronger luminance gradients (outline components) have blacker line segments. Thus, an HOG for each region in the reduced image 851 is calculated, and line segments expressing the edge intensity distribution corresponding to the HOG thereof are expressed, whereby the outline of the object included in the image 850 can show up. However, the object included in the image 850 is an object other than a person, so the outline of a person will not show up.

Figure 10A:
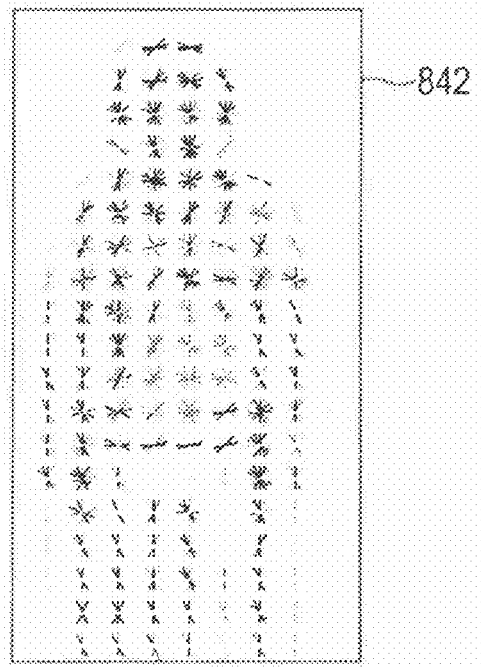
FIGS. 10A and 10B are diagrams illustrating line segments that express the edge intensity distribution shown in FIGS. 8A through 9C.
Figure 10B:
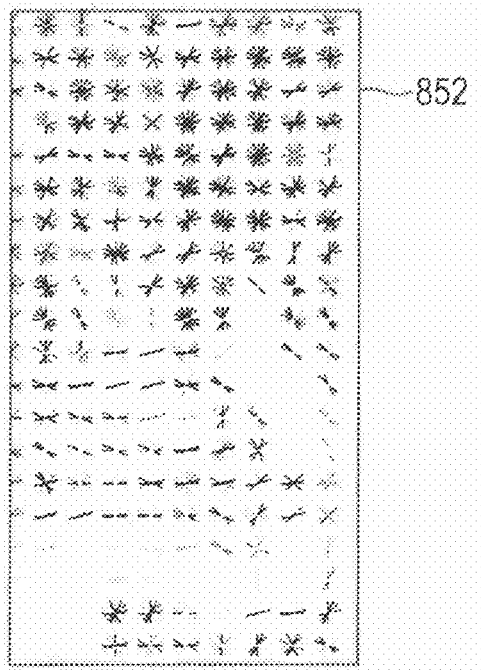

FIGS. 10A and 10B are diagrams showing the line segments expressing the edge intensity distribution shown in FIG. 8A through FIG. 9C. FIG. 10A shows the image 842 shown in FIG. 8C, and FIG. 10B shows the image 852 shown in FIG. 9C. Note that images 842 and 852 are shown with a portion of the line segments omitted. As shown in FIGS. 10A and 10B, upon comparing the multiple line segments expressing the edge intensity distribution created of the image in which a person is included and the multiple line segments expressing the edge intensity distribution created of the image in which an object other than a person is included, a pattern unique to a person can be understood. Thus, by collecting a large number of images including a person and images not including a person and by learning the patterns unique to a person, a person detection dictionary to be used for person detecting processing can be created.

FIG. 11 is a diagram showing an overview of the person detection dictionary 310 stored in the person detection dictionary storage unit 300 according to an embodiment of the present invention. The person detection dictionary 310 is determining information that calculates an HOG for an identified region of the determination target image extracted by the image extracting unit 233, and is for performing person determining processing using the HOG herein. Note that the embodiment of the present invention will be described with an example to detect the body of a standing person as the person.

The person detection dictionary 310 has stored therein t sets of combinations of a position 1 (x1, y1) 311, class 1 (R1) 312, position 2 (x2, y2) 313, class 2 (R2) 314, threshold (th) 315, and weighting (a) 316. Also, the person detecting dictionary 310 is determining information in order to detect the body of a standing person.

The position of a region to serve as an HOG calculation target on the determination target image is stored in the position 1 (x1, y1) 311. For example, the coordinates (x, y) in the case that the determination target image extracted by the image extraction unit 233 are xy coordinates (plane coordinates) are stored at the position 1 (x1, y1) 311. For example, in the case that the position of the region 810 in the determination target image 800 shown in FIG. 4A is stored at the position 1 (x1, y1) 311, the coordinates (x, y) of the pixel 1 at the upper left corner of the region 810 (shown in FIG. 4B) are stored.

Of the HOG classes calculated for the region wherein a position is stored in the position 1 (x1, y1) 311, the class used for person detecting processing is stored in the class 1 (R1) 312. For example, in the case that the HOG class calculated for the region identified by the position stored in the position 1 (x1, y1) 311 is 8 classes similar to FIG. 6B, a value of some class (e.g., a value of 0 through 7) is stored in the class 1 (R1) 312.

The position of a region to serve as an HOG calculation target on the determination target image is stored in the position 2 (x2, y2) 313. Note that the content to be stored in the position 2 (x2, y2) 313 is similar to the position 1 (x1, y1) 311 so the description thereof will be omitted here. However, let us say that a region identified by the position stored in the position 2 (x2, y2) 313 in the same record is a different region from the region identified by the position stored in the position 1 (x1, y1) 311.

Of the HOG classes calculated for the region wherein a position is stored in the position 2 (x2, y2) 313, the class used for person detecting processing is stored in the class 2 (R2) 314. Note that the content to be stored in the class 2 (R2) 314 is similar to the class 1 (R1) 312 so the description thereof will be omitted here. However, there may be cases wherein a class stored in the class 2 (R2) 314 in the same record is the same as a class stored in the class 1 (R1) 312, and there may be cases wherein the classes differ.

A threshold value relating to the difference value between a value corresponding to the class stored in the class 1 (R1) 312 and a value corresponding to the class stored in the class 2 (R2) 314 is stored in the threshold (th) 315. That is to say, the value of the class stored in the class 1 (R1) 312 in the HOG calculated for the region identified by the position stored in the position 1 (x1, y1) 311 is extracted. Also, the value of the class stored in the class 2 (R2) 314 in the HOG calculated for the region identified by the position stored in the position 2 (x2, y2) 313 is extracted. The threshold value stored in the threshold (th) 315 is used as a threshold relating to the difference value of the two extracted values herein.

A weighting used to calculate a score for performing person detecting processing is stored in the weighting (a) 316. The score is an evaluation value expressing the degree of the person. Note that the score calculation expressing the degree of the person that is performed using the values herein will be described in detail with reference to FIGS. 14 through 15. Note that each value associated with the same record of the person detection dictionary 310 is an example of determining information referred to in the Summary of the Invention.

Also, each of the values herein are set using the 500 most effective combinations of those learned by a mechanical learning algorithm such as AdaBoost, for example. As images to serve as learning targets, an image including the body of a standing person and an image that does not include the body of a standing person are used, for example. Also, the person detection dictionary used for the determining processing is determining information that holds the data relating only to determination standards in the event of determining whether or not the determination target image includes a person, and does not hold the image itself. Therefore, the storage capacity can be reduced, while quickly performing determining processing. Note that SVM (Support Vector Machine) or Real AdaBoost or the like may be used as a mechanical learning algorithm.

Next, a person detection method to detect a person will be described in detail with reference to the diagrams.

Figure 13:
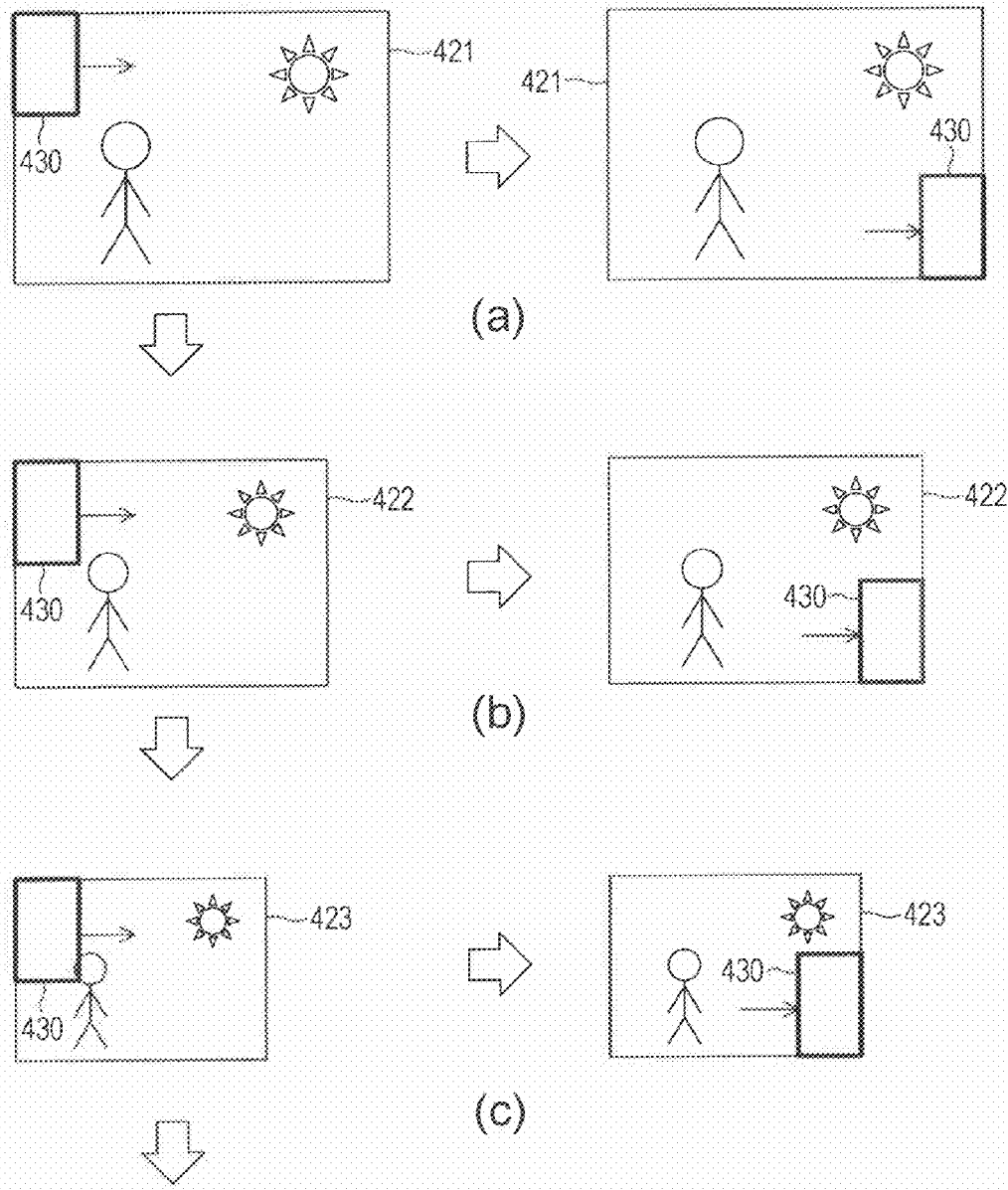
FIG. 13 is a diagram schematically illustrating an image extraction method to extract an image that is to be a target of person determining processing by the person determining unit according to an embodiment of the present invention.

FIGS. 12 and 13 are diagrams schematically showing an image extraction method to extract an image (determination target image) that will serve as a target for person determining processing by the person determining unit 235 according to an embodiment of the present invention. In FIG. 12, (a) shows an image 400 subjected to reduction processing by the image reduction unit 232, and (b) schematically shows an image extraction method in the case of extracting a determination target image from the image 400. Note that the extraction of the determination target image is performed by the image extraction unit 233.

The image 400 shown in (a) in FIG. 12 is an imaged image wherein a person standing on the ground is the subject thereof. In the case of extracting the determination target image from the image 400, as shown in (b) in FIG. 12 an extracting frame 401 is positioned in the upper left corner of the image 400, and the image included in the extracting frame 401 is extracted. Next, the extracting frame is shifted by one pixel to the right side direction (the direction shown with arrows 411 through 416), and the image included within the extracting frame is extracted. Similarly, the extracting frame is sequentially shifted one pixel at a time in the right side direction, and the image included in the extracting frame is sequentially extracted. Upon the extracting frame being shifted to the position of the extracting frame 402 serving as the right edge of the image 400 and the image included in the extracting frame 402 is extracted, the extracting frame is shifted downwards by one pixel and moved to the left edge of the image 400. Next, upon the image included in the extracting frame immediately following moving to the left edge of the image 400 being extracted, the extracting frame is sequentially shifted in the right side direction one pixel at a time, and the image included in the extracting frame is sequentially extracted. Hereafter, the images included in the extracting frame are similarly sequentially extracted. Upon the extracting frame being shifted to the position of the extracting frame 404 which serves as the right edge and the lower edge of the image 400, and the images included in the extracting frame 404 being extracted, the extracting processing of the determination target image from the image 400 is ended.

FIG. 13 shows the images 421 through 423 subjected to sequential reduction processing by the image reduction unit 232. Also, in the images 421 through 423 on the left side of (a) through (c), the first disposal position of the extracting frame 430 is shown, and in the images 421 through 423 on the right side of (a) through (c), the last disposal position of the extracting frame 430 is shown. Now, the movement of the extracting frame 430 from the first disposal position to the last disposal position is similar to the movement shown in (b) in FIG. 12. Also, the size of the extracting frame 430 is a constant, regardless of the size of the image serving as the extraction target. Image extracting processing is performed until the size of the image subjected to reduction processing by the image reduction unit 232 becomes smaller than the extracting frame 430. Note that the source image serving as the reduction processing target is for example an image of 320 pixels×240 pixels. Also, the reduction processing performed by the image reduction unit 232 can be reduction processing that reduced the previous image by 0.83 times, for example.

Next, an example of performing determining processing for a determination target image using the person detection dictionary will be described in detail with reference to the drawings.

Figure 14:
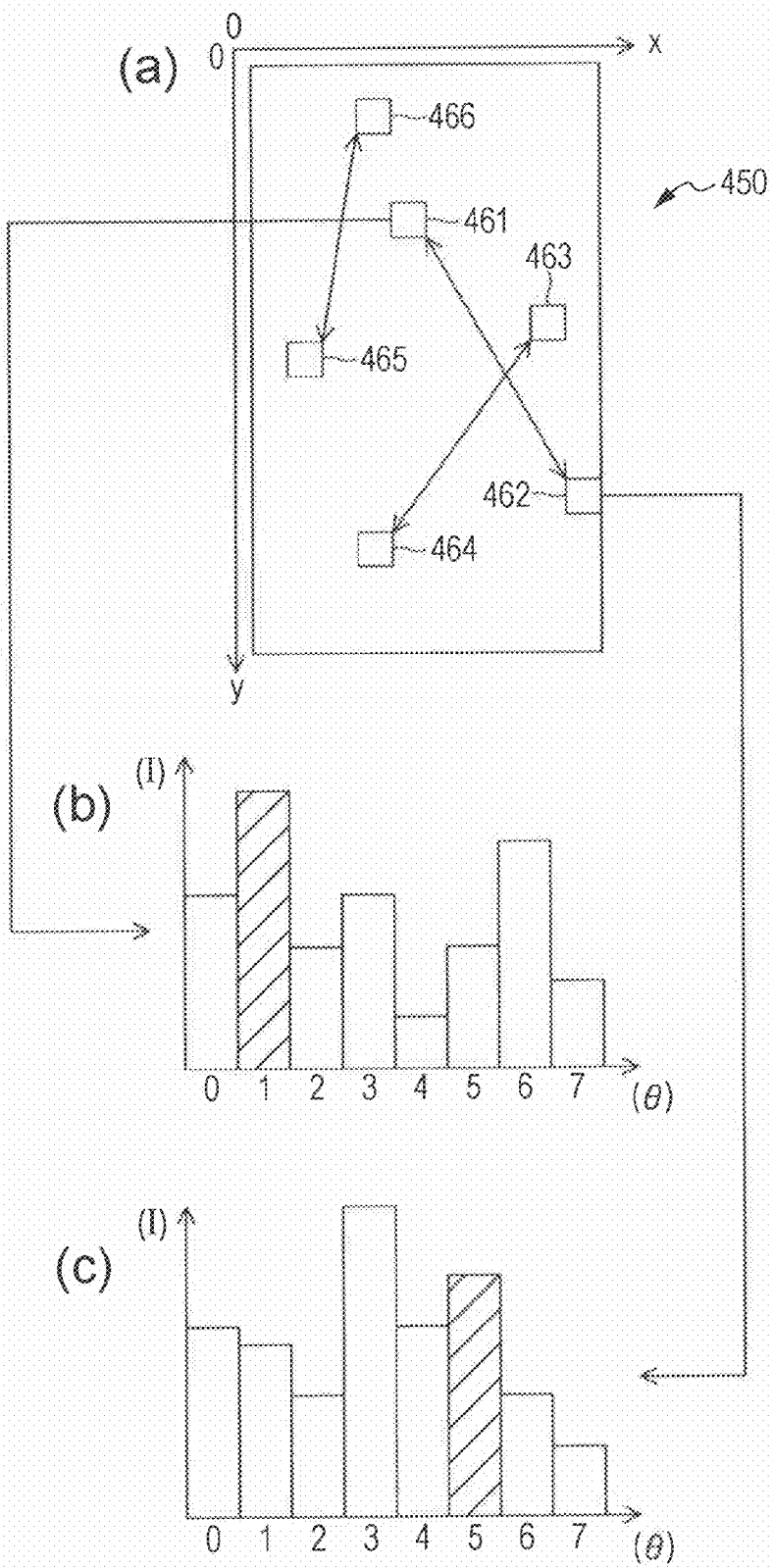
FIG. 14 is a diagram illustrating a determining target image and a histogram (HOG) used for determining processing according to an embodiment of the present invention.
Figure 15:
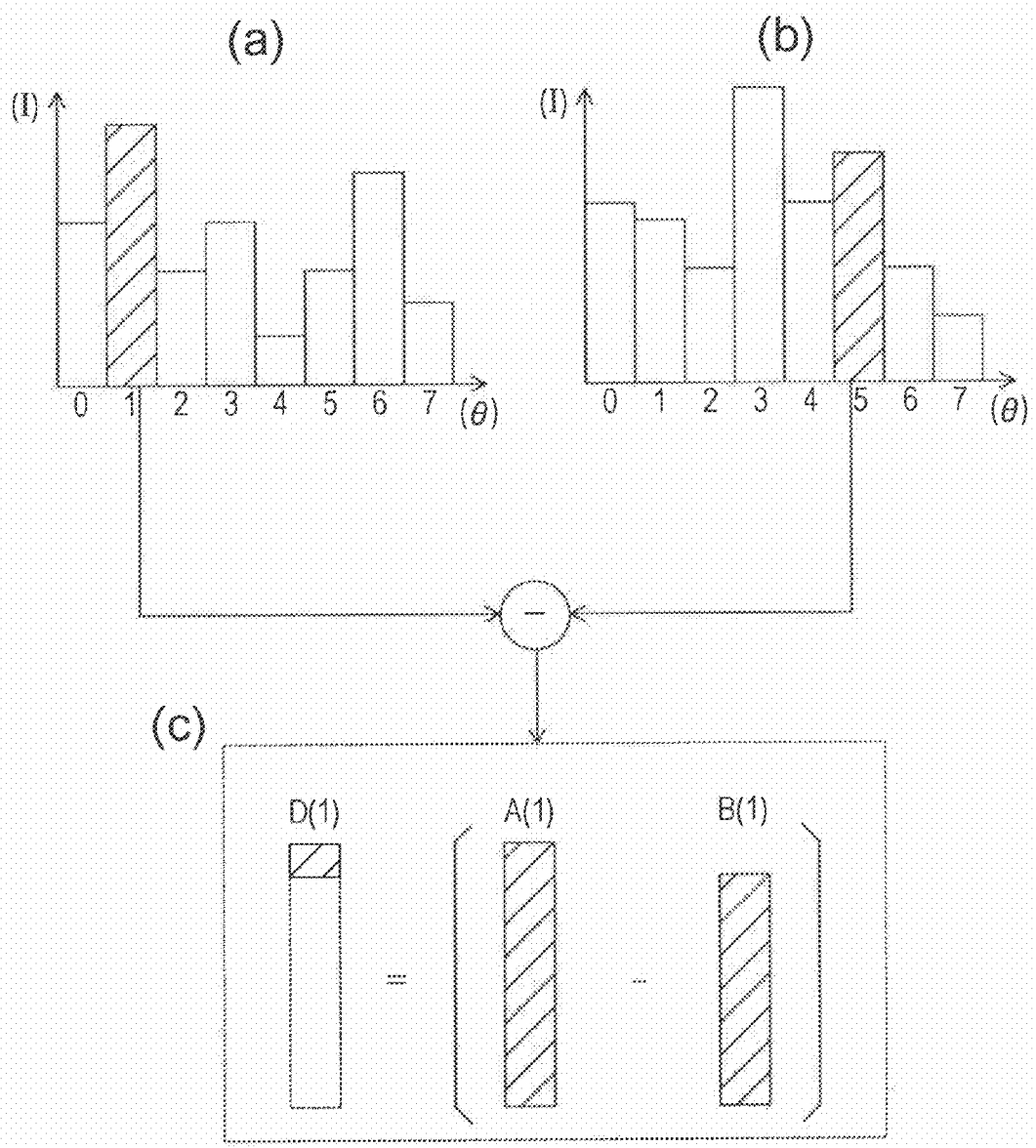
FIG. 15 is a diagram illustrating a determining target image and a histogram (HOG) used for determining processing according to an embodiment of the present invention.

FIGS. 14 and 15 are diagrams showing a determination target image according to the embodiment of the present invention and a histogram (HOG) used for determining processing. In FIG. 14, (a) shows the determination target image 450 extracted by the image extracting unit 233, and (b) in FIG. 14 shows two HOGs used for determining processing. Also, FIG. 15 shows a model of a computing method using the two HOGs shown in (b) and (c). In this example, a case will be described to perform determining processing using the person detection dictionary 310 (shown in FIG. 11) for the determination target image 450, with the upper left corner of the determination target image 450 as the origin point, the horizontal direction as the x-axis, the vertical direction as the y-axis shown in (a) in FIG. 14.

The determination target image 450 shown in (a) in FIG. 14 is the image extracted by the image extraction unit 233 from the image subjected to reduction processing by the image reduction unit 232, from the imaged image generated by the imaging unit 112. Now let us say that the source image to be the target of reduction processing by the image reduction unit 232 is an image of 320 pixels×240 pixels for example, and the determination target image 450 is an image of 50 pixels×100 pixels, similar to the determination target image 800 shown in FIGS. 4A and 4B, for example.

First, the HOG calculating unit 234 identifies two regions used for determining (region E1(i) and region E2(i)). The two regions are identified by the positions stored in the position 1 (x1, y1) and position 2 (x2, y2) of the person detection dictionary 310. For example, a region E1(i) is identified so that the pixel on the upper left corner of the rectangle in the region E1(i) is at the position of the coordinate point stored in the position 1 (x1, y1) of the person detection dictionary 310. Also, similarly, the region E2(i) is identified by the position stored in the position 2 (x2, y2) of the person detection dictionary 310. Now, i is a value expressing each record of the person detection dictionary 310, whereby 1≦i≦t.

Next, the HOG calculating unit 234 calculates an HOG for each of the region E1(i) and region E2(i) identified in the determination target image 450. The HOG calculation method herein is similar to the method shown in FIGS. 4A through 6C, so the description thereof will be omitted here.

Next, the person determining unit 235 extracts, from the HOG classes calculated regarding the region E1(i), a value A(i) of a class corresponding to the value of the class R1(i) stored in the class 1 (R1) 312 of the person detection dictionary 310. Also, the person determining unit 235 extracts, from the HOG classes calculated regarding the region E2(i), a value B(i) of a class corresponding to the value of the class R2(i) stored in the class 2 (R2) 314 of the person detection dictionary 310. Next, the person determining unit 235 calculates the difference value D(i) between the two extracted values. The difference value D(i)=A(i)−B(i).

Next, the person determining unit 235 compares the threshold value th(i) stored in the threshold (th) 315 of the person detection dictionary 310 and the difference value D(i). Next, according to whether the threshold is smaller than the difference value D(i), the person determining unit 235 calculates a Weak Learner h(i). Specifically, the Weak Learner h(i) is calculated using the following Expressions.

If difference value $D(i)$>threshold value $th(i)$, then
Weak Learner $h(i)=1$

If difference value $D(i)\leq$threshold value $th(i)$, then
Weak Learner $h(i)=0$ Next, the person determining unit 235 calculates h(i)α(i) by multiplying the calculated Weak Learner h(i) and the value α(i) stored in the weighting (α) 316. The person determining unit 235 repeatedly performs the calculating processing from the first row through the t'th row of the person detection dictionary 310, and calculates the total value of h(i)α(i) as a score S. Specifically, the score S (final assumption) is calculated using Expression 3. The score S herein is an example of an evaluation value referred to in the Summary of the Invention.

$$S = \sum_{i=1}^{t} h(i) \cdot \alpha(i)$$ Expression 3

$$S > \frac{\sum_{i=1}^{t} \alpha(i)}{2}$$ Expression 4

Next, the person determining unit 235 determines whether or not a person is included in the determination target image 450, based on the score S calculated by the Expression 3. Specifically, in the case that the score S satisfies the Expression 4, determination is made that a person is included in the determination target image 450. On the other hand, in the case that the score S does not satisfy the Expression 4, determination is made that a person is not included in the determination target image 450. Note that the value on the right side of Expression 4 may be stored in the person detection dictionary 310, or may be calculated with each person detecting processing. Also, the difference value D(i) may be adjusted using a gain coefficient or the like. For example, in the case that the gain coefficient is K, the difference value D(i) can be adjusted as K·D(i). Also, in this example, as a determination using the person detection dictionary 310, a determination example has been described that makes a determination based on whether or not the value of the score S satisfies the Expression 4, but determination may be made using a value other than the value on the right side of the Expression 4. That is to say, the value to be compared with the score S can be adjusted as appropriate.

Next, a specific calculating method will be described. In (a) in FIG. 14, let us say that for example a region identified based on each of the values of the position 1 (x1, y1) and position 2 (x2, y2) stored in the first row of the person detection dictionary 310 are regions 461 and 462. Also let us say that for example a region identified based on each of the values of the position 1 (x1, y1) and position 2 (x2, y2) stored in the second row of the person detection dictionary 310 are regions 463 and 464. Also let us say that for example a region identified based on each of the values of the position 1 (x1, y1) and position 2 (x2, y2) stored in the third row of the person detection dictionary 310 are regions 465 and 466.

First, the value of the score S to perform determination is set to 0, and computation using each value stored in the first row of the person detecting dictionary 310 is performed. Specifically, the two regions 461 and 462 are identified from the position 1 (x1, y1) 311 and position (x2, y2) 313 of the first row of the person detection dictionary 310. Next, an HOG is calculated for each of the two regions 461 and 462. For example, the HOG shown in (b) in FIG. 14 is calculated for region 461, and the HOG shown in (c) in FIG. 14 is calculated for region 462. Note that the HOG shown in (b) FIG. 14 and the HOG shown in (a) in FIG. 15 are the same, and the HOG shown in (c) in FIG. 14 and the HOG shown in (b) in FIG. 15 are the same.

Next, a class value corresponding to the value of the class 1 (R1) 312 stored in the first row of the person detection dictionary 310 is extracted from the various classes of the HOG calculated for region 461. Also, a class value corresponding to the value of the class 2 (R2) 314 stored in the first row of the person detection dictionary 310 is extracted from the various classes of the HOG calculated for region 462. For example, the value of the class 1 (indicated by hatching) is extracted from the HOG (region 461) shown in (a) in FIG. 15. Also, for example, the value of the class 5 (indicated by hatching) is extracted from the HOG (region 462) shown in (b) in FIG. 15. Here, let us say that the value extracted from the HOG calculated for the region 461 is A(1) and the value extracted from the HOG calculated for region 462 is B(1). Using the following Expression, the difference value D(1) is calculated.

$$D(1)=A(1)-B(1)$$

For example, as shown in (c) in FIG. 15, the difference value D(1) is calculated. Note that as shown in (a) and (b) in FIG. 15, the value of the class corresponding to the value of the class 1 (R1) 312 or class 2 (R2) 314 stored in the person detection dictionary 310 is not necessarily the greatest value.

Next, the calculated difference value D(1) and the threshold value th(1) of the threshold (th) 315 stored in the first row of the person detection dictionary 310 are compared. According to whether or not the difference value D(1) is smaller than the threshold th(1), a Weak Learner h(1) is calculated. Note that the Weak Learner h(1) is calculated using the above-described Expression.

Next, h(1)α(1) is calculated by multiplying the calculated Weak Learner h(1) and the value α(1) of the weighting (α) 316 stored in the first row of the person detection dictionary 310. The calculated h(1)α(1) is added to the score S.

Next, the above-described computations are repeated using each of the values stored in the second row of the person detection dictionary 310. Specifically, an HOG is calculated for each of the regions 463 and 464 identified by the position 1 (x1, y1) 311 and position 2 (x2, y2) 313 of the second row of the person detection dictionary 310. Next, a class value A(2) corresponding to the value of the class 1 (R1) 312 stored in the second row of the person detection dictionary 310 is extracted from the various classes of the HOG calculated for the region 463. Also, a class value B(2) corresponding to the value of the class 2 (R2) 314 stored in the second row of the person detection dictionary 310 is extracted from the various classes of the HOG calculated for the region 464. The difference value D(2) is then calculated using the following Expression.

$$D(2)=A(2)-B(2)$$

Next, the calculated difference value D(2) and the threshold th(2) of the threshold (th) 315 stored in the second row of the person detection dictionary 310 are compared. According to whether or not the difference value D(2) is smaller than the threshold th(2), the Weak Learner h(2) is calculated.

Next, h(2)α(2) is calculated by multiplying the calculated Weak Learner h(2) and the value α(2) of the weighting (α) 316 stored in the second row of the person detection dictionary 310. The calculated h(2)α(2) is added to the score S.

Next, for the third row and thereafter of the person detection dictionary 310, the above calculations are repeated, sequentially using the values stored up to the t'th row. Upon the calculations ending that use each of the values stored in the t'th row of the person detection dictionary 310, determination is made as to whether or not the value of the score S satisfies the Expression 4.

For example, let us assume case of learning wherein a learning sample of person detecting success at the time of learning with the above-described mechanical learning algorithm is on the positive side, and a learning sample at the time of person detecting failure is on the negative side thereof. In this case, in the case that the value of the score S after ending the various calculations using each value stored in the first through t'th row of the person detection dictionary 310 satisfies Expression 4, determination is made that a person is included in the determination target image. On the other hand, in the case that the value of the score S after ending the various calculations does not satisfy the Expression 4, determination is made that a person is not included in the determination target image.

FIG. 16 is a diagram showing the image 400 that is the target of person detecting processing by the person detecting unit 230 according to an embodiment of the present invention and the detection results of the person detecting processing by the person detecting unit 230. The image 400 shown in (a) in FIG. 16 is the same as the image 400 shown in (a) in FIG. 12, and includes a person 405. In FIG. 16, (b) schematically shows the detection result in the case that the person 405 included in the image 400 has been detected, with a frame 406. The frame 406 is a frame expressing the position and size of the detection results of the person detecting processing by the person detecting unit 230. Based on the detection results, for example the camera parameter control unit 220 can determine the appropriate camera parameters for the detected person. Also, for example, in the case that the image 400 is displayed on the display unit 170, the frame 406 can be overlaid over the image 400 and displayed.

Next, the operations of the imaging apparatus 100 according to an embodiment of the present invention will be described with reference to the drawings.

Figure 17:
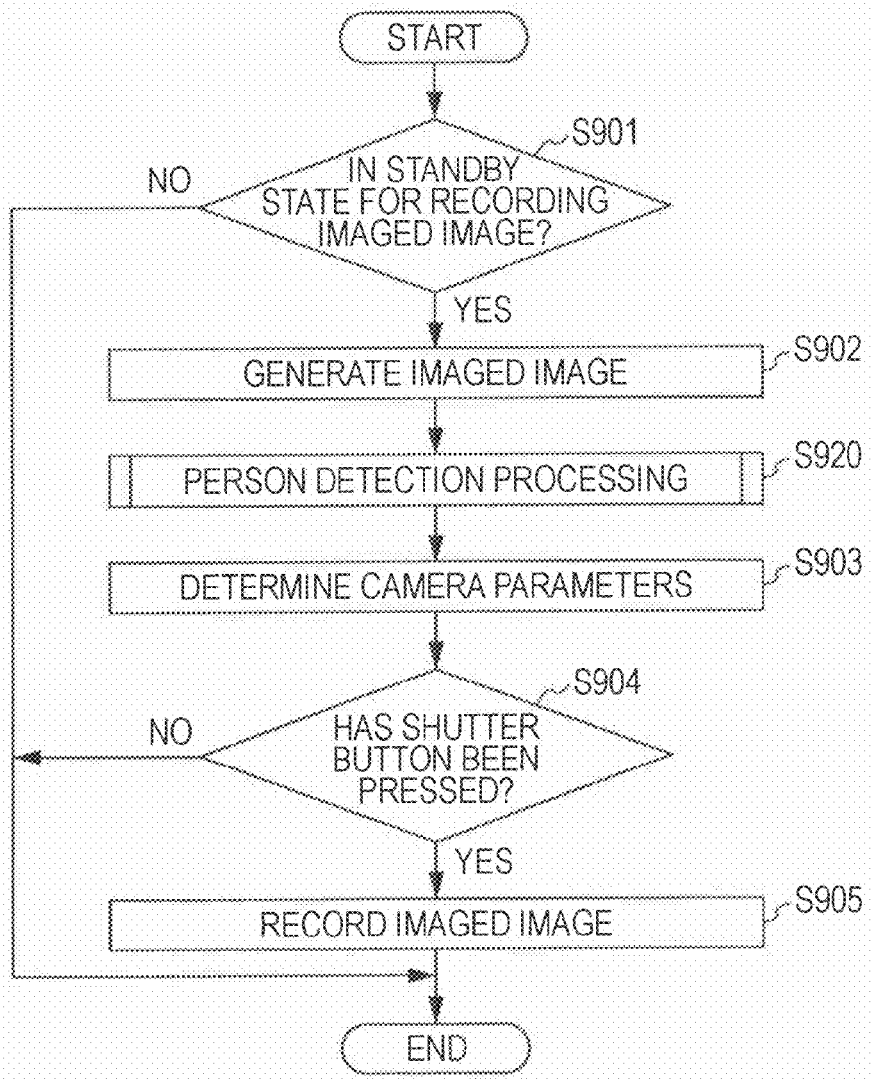
FIG. 17 is a flowchart describing processing procedures of imaged image recording processing by the imaging apparatus according to an embodiment of the present invention.

FIG. 17 is a flowchart showing processing procedures of the imaged image recording processing by the imaging apparatus 100 according to an embodiment of the present invention. In this example herein, an example will be described for the case of an imaged image recording standby state, wherein the imaged image is generated, and person detection processing is performed for the imaged image herein.

First, determination is made as to whether or not the imaging apparatus is in an imaged image recording standby state (step S901). In the case of an imaged image recording standby state (step S901), the imaging unit 112 generates an imaged image (step S902), and the person detecting unit 230 performs person detecting processing for the generated imaged image (step S920). The person detecting processing will be described in detail with reference to FIG. 18. The person detecting processing may be performed as to each frame, or may be performed as to a frame for every constant interval. On the other hand, in the case that the imaging apparatus is not in an imaged image recording standby state (step S901), the operation of the imaged image recording processing is ended.

Next, the camera parameter control unit 220 determines the camera parameters (step S903). For example, in the case that person detecting information is output from the person detecting unit 230, the camera parameter control unit 220 determines the optimal camera parameters for the person detected, based on the position and size of the detected person in the imaged image. Next, determination is made as to whether or not the shutter button is pressed (step S904), and in the case that the shutter button is pressed, the generated imaged image is recorded in the recording unit 150 (step S905). On the other hand, in the case the shutter button is not pressed, the operation of the imaged image recording processing is ended.

Figure 18:
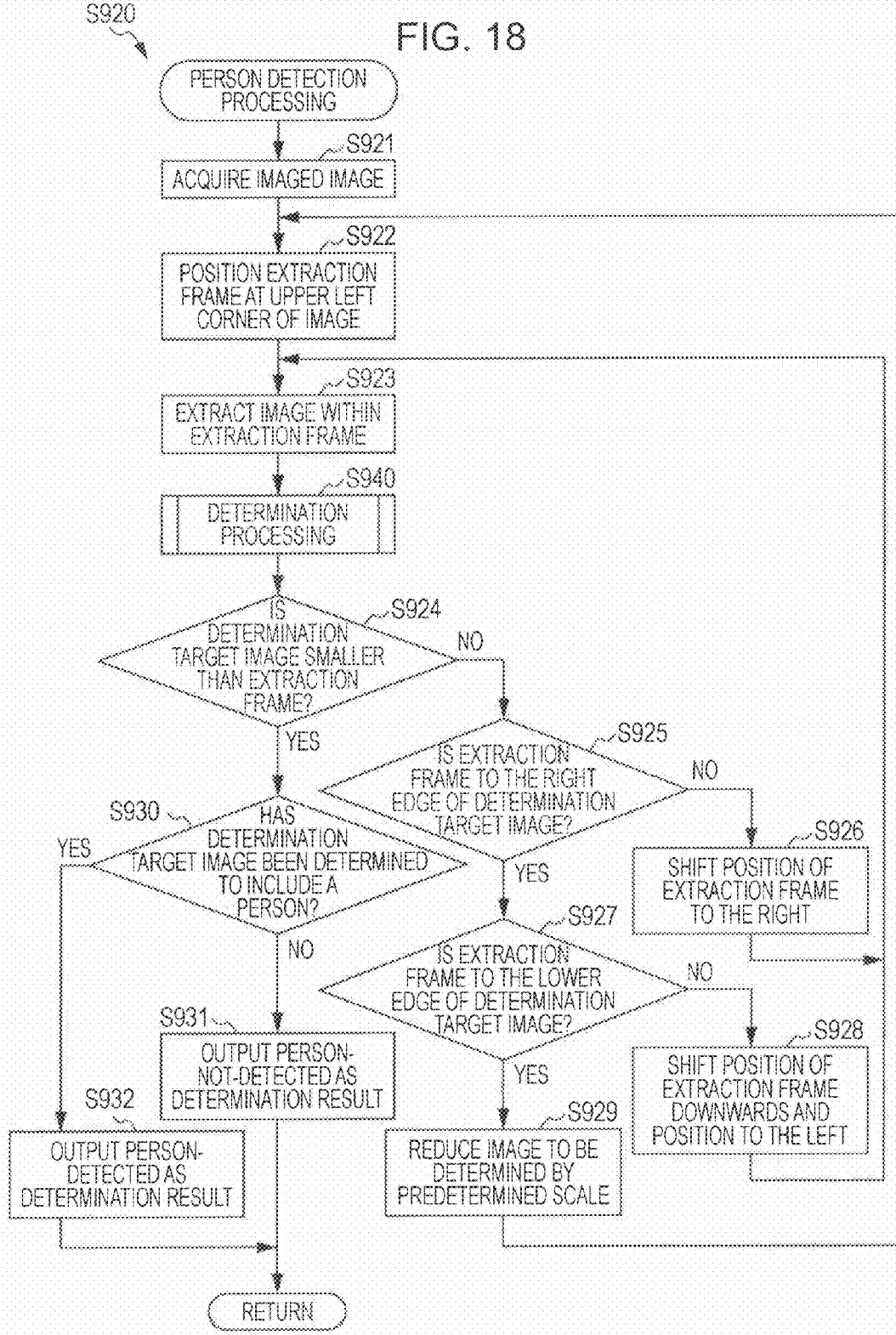
FIG. 18 is a flowchart describing person detecting processing procedures of the imaged image recording processing by the imaging apparatus according to an embodiment of the present invention.

FIG. 18 is a flowchart showing the person detecting processing procedures of the imaged image recording processing by the imaging apparatus 100 according to an embodiment of the present invention (processing procedures of step S920 shown in FIG. 17).

First, the current imaged image stored in the storage device unit 130 is acquired (step S921). Next, the extracting frame is positioned on the upper left corner of the acquired imaged image (step S922), and the image within the extracting frame is extracted (step S923). Next, determining processing is executed (step S940) for the image (determination target image) extracted from the extracting frame, using the person detecting dictionary 310 stored in the person detecting dictionary storage unit 300. Note that the determining processing herein will be described in detail with reference to FIG. 19.

Next, determination is made as to whether or not the determination target image is smaller than the extracting frame (step S924). In the case that determination target image is not smaller than the extracting frame (step S924), determination is made as to whether or not an extracting frame exists on the right edge of the determination target image (step S925). In the case that an extracting frame does not exist on the right edge of the determination target image (step S925), the extracting frame is shifted and positioned one pixel to the right side on the determination target image (step S926), and the flow is returned to step S923. On the other hand, in the case that an extracting frame exists on the right edge of the determination target image (step S925), determination is made as to whether or not an extracting frame exists on the lower edge of the determination target image (step S927). In the case that an extracting frame does not exist on the lower edge of the determination target image (step S927), the extracting frame is shifted one pixel to the lower side on the determination target image (step S928) while being positioned on the left edge of the determination target image (step S928), and the flow is returned to step S923. In the case that an extracting frame exists on the lower edge of the determination target image (step S927), the determination target image is subjected to reduction processing at a predetermined ratio (step S929), and the extracting frame is positioned at the upper left corner on the image after reduction processing (step S922).

On the other hand, in the case that the determination target image is smaller than the extracting frame (step S924), determination is made as to whether or not determination is made that a person is included in the determination target image (step S930). In the case determination is made that a person is included in the determination target image (step S930), person detecting information that indicates information to the effect that a person has been detected is output as the determination result (step S932). In the case determination is made that multiple persons are included in the determination target image, person detecting information relating to multiple persons is output. Also, for overlapping regions, in the case that determinations are made multiple times that a person is included, for example person detecting information is output based on the position and size of the extracting frame wherein the score S calculated in the determining processing in step S940 is greatest. On the other hand, in the case determination is not made that a person is included in the determination target image (step S930), person-not-detected information is output, indicating information to the effect that a person has not been detected, as the determination result (step S931).

Note that in this example, an example is described wherein, even in the case that determination has been made once that a person is included in the determination target image, determining processing is repeatedly performed until the determination target image becomes smaller than the extracting frame, and based on the determination result thereof, determination is made as to whether or not a person has been detected from the current imaged image. However, in the case that determination has been made once that a person is included in the determination target image, the person detecting information indicating information to the effect that a person has been detected from the current imaged image can be output without subjecting other determination target images to determining processing.

Figure 19:
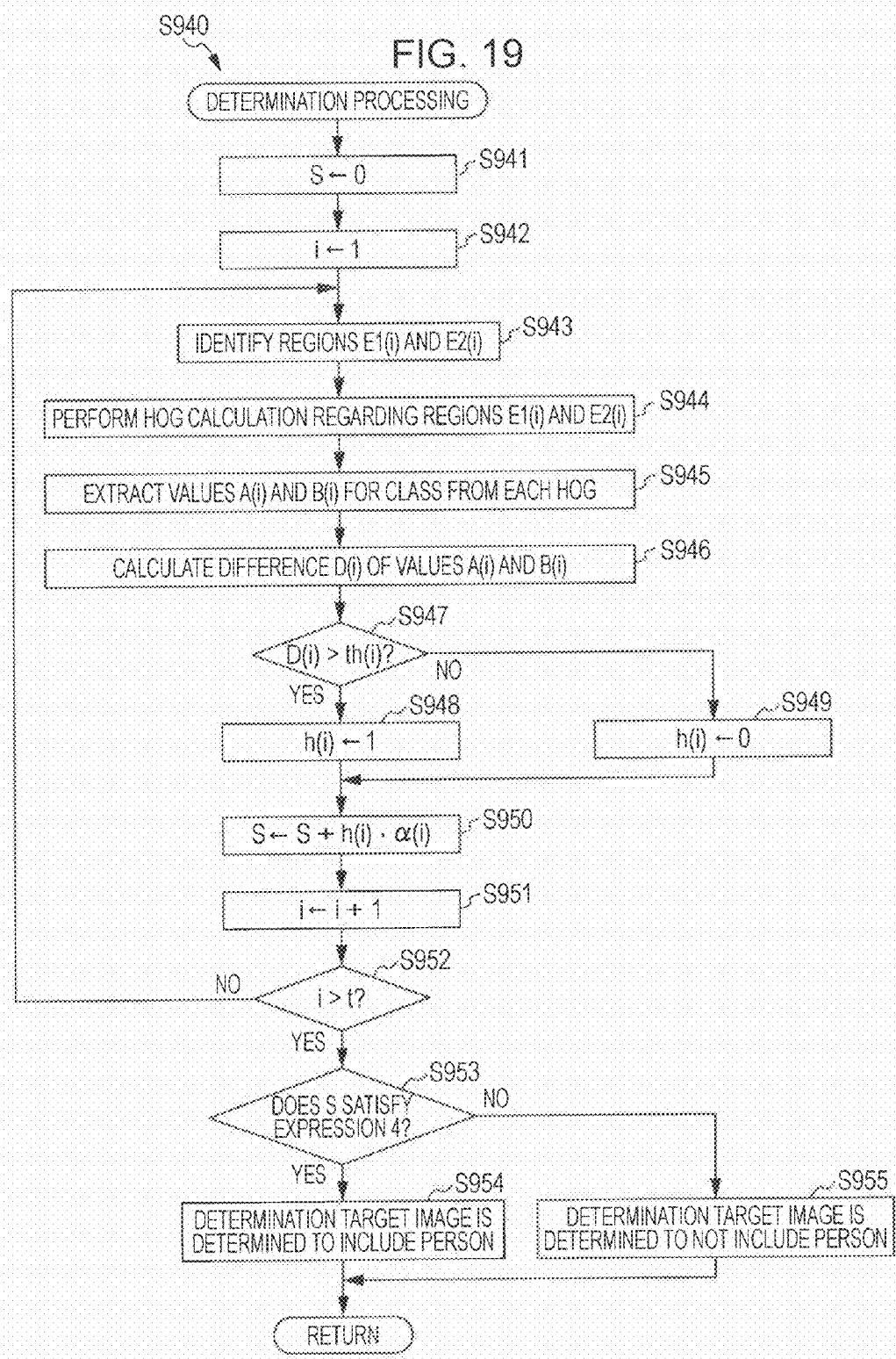
FIG. 19 is a flowchart describing determining processing procedures of the person detecting processing by the imaging apparatus according to an embodiment of the present invention.

FIG. 19 is a flowchart showing the determining processing procedures of the person detecting processing by the imaging apparatus 100 according to an embodiment of the present invention (processing procedures in step S940 shown in FIG. 18).

First, the score S is initialized to "0" (step S941), and the variable i is initialized to "1" (step S942). Next, the region E1($i$) in the determination target image is identified based on the values of the position 1 (x1, y1) stored in the i'th row of the person detection dictionary 310, and the region E2($i$) in the determination target image is identified based on the values of the position 2 (x2, y2). Next, an HOG is calculated for each of the identified regions E1($i$) and E2($i$) (step S944). Note that the calculated HOG for the identified regions are sequentially stored, and may be enabled to be used in the case of HOG calculations for other records. Step S944 is one example of the calculating referred to in the Summary of the Invention.

Next, a class value A(i) corresponding to the value of the class 1 (R1) 312 stored in the i'th row of the person detection dictionary 310 is extracted from the various classes of the HOG calculated for the region E1($i$). Also, a class value B(i) corresponding to the value of the class 2 (R2) 314 stored in the i'th row of the person detection dictionary 310 is extracted from the various classes of the HOG calculated for the region E2($i$) (step S945). Next, the difference value D(i) between the extracted values A(i) and B(i) is calculated (step S946).

Next, the threshold value th(i) of the threshold (th) 315 stored in the i'th row of the person detection dictionary 310 and the calculated difference value D(i) are compared (step S947). In the case that the calculated difference value D(i) is greater than the threshold value th(i) (step S947), the calculation Weak Learner h(i)=1 holds (step S948). On the other hand, in the case that the calculated difference value D(i) is less than the threshold value th(i) (step S947), the calculation Weak Learner h(i)=0 holds (step S949).

Next, the value $\alpha$(i) of the weighting ($\alpha$) 316 stored in the i'th row of the person detection dictionary 310 and the calculated Weak Learner h(i) are multiplied, and the value h(i) $\alpha$(i) obtained by the multiplication herein is added to the score S (step S950).

Next, "1" is added to the variable i (step S951), and determination is made as to whether or not the variable i is greater than t (step S952). In the case that the variable i is not greater than t (step S952), determination processing for the value of each row of the person detection dictionary 310 has not ended, whereby the flow is returned to step S943, and the determining processing is repeated (steps S943 through S951). On the other hand, in the case that the variable i is greater than t (step S952), determination processing for the value of each row of the person detection dictionary 310 has ended, whereby the flow is advanced to step S953, and determination is made as to whether the value of the score S satisfies the above-described Expression 4 (step S953).

In the case that the value of the score S satisfies the above-described Expression 4 (step S953), determination is made that the determination target image includes a person (step S954). On the other hand, in the case that the value of the score S does not satisfy the above-described Expression 4 (step S953), determination is made that the determination target image does not include a person (step S955). Note that steps S945 through S955 are an example of the determining referred to in the Summary of the Invention.

In the example herein, description is given for an example to sequentially calculate HOGs corresponding to each value from the first row to the t'th row of the person detection dictionary 310. However, for example an arrangement may be made wherein first, HOGs are calculated and stored for all regions in the determination target image, and scores S are calculated corresponding to each value from the first row to the t'th row of the person detection dictionary 310, using the stored HOGs.

Also, in the example herein, description is given for an example to perform determining processing after calculating the score S using each value from the first row to the t'th row of the person detection dictionary 310. However, an arrangement may be made wherein, for example, a cutoff threshold is stored that corresponds to each record of the person detection dictionary 310, and in the case that the score S obtained in step S950 falls below the cutoff threshold, the determining processing is discontinued. The determination processing can thus be made faster.

As shown above, according to an embodiment of the present invention, person detecting is performed using the outline of a person, whereby person detecting can be performed appropriately even in the case that the color of clothing and so forth of a person differs. Also, determining processing is performed using a difference value of the HOG classes calculated for two regions, whereby normalizing does not have to be performed according to the lightness/darkness of the subject, for example. Also, the various regions to be HOG calculation targets in the determination target image are not layered, whereby the amount of computing such as HOG calculations can be reduced. Thus, the processing speed of the person detecting processing can be made faster. Also, person detecting is performed using the difference in luminance gradient elements, not luminance itself, whereby the precision of the person detecting processing can be improved regardless of the lightness/darkness of the subject.

Also, detection is performed using the outline of a person, whereby for example, the body of a person standing facing forward and the body of a person standing facing backward can be appropriately detected using the person detection dictionary 310. Also, for example, by using the outline of a side view of a person or the outline of a side view of a face of the like, the body of the standing person can be appropriately detected regardless of the position of hands. For example, using the person detection dictionary 310, the body of a person standing with raised arms can be detected.

Also, an example has been described according to an embodiment of the present invention wherein the HOG classes are 8 classes, but the HOG classes may be other than 8 classes. Also, according to an embodiment of the present invention, an example is described wherein the region subject to HOG calculation is 5 pixels×5 pixels, but the region may be 4 pixels×4 pixels and so forth. Also, a portion of each region subject to HOG calculation in the determination target image can be set so as to be overlapped.

Also, an example has been described according to an embodiment of the present invention wherein the body of a standing person is detected using the person detection dictionary 310, but detection using the detection dictionary can be made corresponding to each of a person lying down and a person sitting, for example. The dictionaries herein are dictionaries learned for each of the persons subject to detection.

Also, an example has been described according to an embodiment of the present invention wherein the body of only a standing person is detected using the person detection dictionary 310, but detection of multiple identified objects can be made using multiple detection dictionaries, for example. For example, multiple detection dictionaries can be stored in the person detection dictionary storage unit 300, and object detecting processing can be performed using each detecting dictionary for each imaged image. That is to say, if the format for each detection dictionary is the same, and the resolution of the determination target image has the same resolution, multiple detection dictionaries can be switched, whereby object detecting processing can be performed with the same algorithm for multiple identified objects.

Also, an example has been described according to an embodiment of the present invention wherein the body of a standing person is detected as an identified object that is the target of object detecting processing, but the embodiment of the present invention is applicable to objects other than person that can be identified by an outline. For example, the embodiment of the present invention is applicable in the case that the identified objects are bodies of animals such as mammals, reptiles, and fish (e.g. pets), or vehicles, airplanes, and so forth.

Also, the embodiment of the present invention can be applied to various types of imaging apparatus such as digital video cameras that image a still image or moving image (e.g. integrated camera/recorder) and portable telephones having imaging functions. Also, for example, the embodiment of the present invention can be applied to an object detecting device such as a vehicle object detecting device that detects other vehicles.

Also, the processing procedures described according to the embodiment of the present invention may be viewed as being a method including a flow of procedures, or may be viewed as being a program for a computer to execute the flow of procedures and a recording medium to record the program thereof. Examples of the recording medium include a CD (Compact Disc), MD (MiniDisc), DVD (Digital Versatile Disk), memory card, and Blu-ray Disc (registered trademark).

The present application contains subject matter related to that disclosed in Japanese Priority Patent Application JP 2008-234085 filed in the Japan Patent Office on Sep. 12, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An object detecting device comprising:
   a calculating unit configured to
      calculate gradient intensity and gradient orientation of luminance for a plurality of regions in an image,
      calculate a frequency distribution of the luminance gradient intensity as to said calculated luminance gradient orientation for each of said regions, and
      calculate an edge intensity distribution for each of said regions, based on the calculated frequency distribution; and
   a determining unit configured to identify an object included in said image by using an outline of the object that is obtained based on the calculated edge intensity distribution and by using an evaluation score.

2. The object detecting device according to claim 1, wherein said calculating unit calculates each of said frequency distributions for a first region and a second region set beforehand in said image;
   and wherein said determining unit determines whether or not the identified object is included in said image by comparing a value of one class set beforehand of classes of the frequency distribution calculated for said first region and a value of one class set beforehand of classes of the frequency distribution calculated for said second region.

3. The object detecting device according to claim 2, wherein said calculating unit calculates a plurality of combinations of said frequency distribution relating to said first region and said frequency distribution relating to said second region;

and wherein said determining unit determines whether or not the identified object is included in said image by comparing each of said combinations of a value of one class set beforehand of classes of the frequency distribution calculated for said first region and a value of one class set beforehand of classes of the frequency distribution calculated for said second region.

4. The object detecting device according to claim 2, wherein said determining unit determines whether or not the identified object is included in said image by calculating a difference value between a value of one class set beforehand of classes of the frequency distribution calculated for said first region and a value of one class set beforehand of classes of the frequency distribution calculated for said second region.

5. The object detecting device according to claim 2, wherein said first region and said second region are regions that do not mutually overlap in said image.

6. The object detecting device according to claim 1 further comprising:

a determining information storage unit configured to store a plurality of sets of determining information, including combinations of a first position that is a position of a region in said image,
  a first class that is one class of the classes of said frequency distribution,
  a second class that is a position of a region in said image and that differs from said first position,
  a second class that is one class of the classes of said frequency distribution,
  a threshold value, and
  a weighting value;
wherein said calculating unit calculates the first frequency distribution which is said frequency distribution relating to the region identified by said first position and the second frequency distribution which is said frequency distribution relating to the region identified by said second position, for each set of said determining information;
and wherein said determining unit determines whether or not an identified object is included in said image based on an evaluation value, said evaluation value calculated by
calculating a difference value between the value of said first class of the classes of said first frequency distribution and the value of said second class of the classes of said second frequency distribution,
  comparing said difference value and said threshold value, and
  calculating an evaluation value by performing computing of said weighting value based on said compared result for each set of said determining information.

7. The object detecting device according to claim 1 wherein said identified object is a person.

8. An imaging apparatus comprising:
an imaging unit configured to image a subject and generate an imaged image;
an image extracting unit configured to extract a determination target image serving as a determination target from said imaged image;
a calculating unit configured to
  calculate gradient intensity and gradient orientation of luminance for a plurality of region in said determination target image,
  calculate a frequency distribution of luminance gradient intensity as to said calculated luminance gradient orientation for each of said regions, and
  calculate an edge intensity distribution for each of the said regions, based on the calculated frequency distribution; and
a determining unit configured to identify an object is included in said determination target image by using an outline of the object, obtained based on the calculated edge intensity distribution and by using an evaluation score.

9. An object detecting method comprising the steps of:
calculating of gradient intensity and gradient orientation of luminance for a plurality of region in an image;
calculating of a frequency distribution of luminance gradient intensity as to said calculated luminance gradient orientation for each of said regions; and
calculating of an edge intensity distribution for each of said regions, based on the calculations of said frequency distribution; and
identifying an object in said image using an outline of the object, obtained based on the calculated edge intensity distribution and by using an evaluation score.

10. A non-transitory computer readable medium having stored thereon a program that when executed by a computer causes the computer to execute the steps of:
calculating of gradient intensity and gradient orientation of luminance for a plurality of region in an image;
calculating of a frequency distribution of luminance gradient intensity as to said calculated luminance gradient orientation for each of said regions;
calculating an edge intensity distribution for each of said regions, based on the calculations of said frequency distribution; and
identifying an object in said image using an outline of the object, obtained based on the calculated edge intensity distribution and by using an evaluation score.

11. The object detecting device according to claim 1, wherein the determining unit compares a plurality of frequency distributions calculated for each of said regions.

12. The object detecting device according to claim 2, wherein an edge intensity distribution is computed for said first and second regions, based on said frequency distributions.

13. The object detecting device according to claim 4, wherein a weak learner value is evaluated based on the said difference value calculated by the determining unit.

14. The object detecting device according to claim 13, wherein the said weak learner value is weighted with a weighing value to determine the evaluation score.

* * * * *